(12) United States Patent
Uhr et al.

(10) Patent No.: US 10,944,574 B2
(45) Date of Patent: Mar. 9, 2021

(54) METHOD FOR PROVIDING VIRTUAL ASSET SERVICE BASED ON DECENTRALIZED IDENTIFIER AND VIRTUAL ASSET SERVICE PROVIDING SERVER USING THEM

(71) Applicant: COINPLUG, INC., Gyeonggi-do (KR)

(72) Inventors: Joon Sun Uhr, Gyeonggi-do (KR); Joo Han Song, Gyeonggi-do (KR)

(73) Assignee: COINPLUG, INC., Gyeonggi-Do (KR)

( * ) Notice: Subject to any disclaimer, the term of this patent is extended or adjusted under 35 U.S.C. 154(b) by 0 days.

(21) Appl. No.: 16/919,553

(22) Filed: Jul. 2, 2020

(65) Prior Publication Data
US 2021/0006410 A1  Jan. 7, 2021

(30) Foreign Application Priority Data

Jul. 3, 2019  (KR) .................. 10-2019-0080350
Jun. 22, 2020  (KR) .................. 10-2020-0076078

(51) Int. Cl.
*H04L 9/32* (2006.01)
*H04L 29/06* (2006.01)
(Continued)

(52) U.S. Cl.
CPC ....... *H04L 9/3247* (2013.01); *G06Q 20/3825* (2013.01); *G06Q 20/3829* (2013.01);
(Continued)

(58) Field of Classification Search
CPC ..... H04L 9/3247; H04L 63/0884; H04L 9/30; H04L 2209/38; H04L 2209/56;
(Continued)

(56) References Cited

U.S. PATENT DOCUMENTS 10,587,413 B1 *  3/2020  Todd .................. H04L 9/3239
2013/0282580 A1 * 10/2013  O'Brien ............. G06Q 20/4014
705/44
(Continued)

FOREIGN PATENT DOCUMENTS

KR  10-2018-0079805 A  7/2018
KR  10-2018-0113145 A  10/2018
(Continued)

OTHER PUBLICATIONS

Decentralized digital identities and blockchain: The future as we see it, Microsoft 365, Feb. 12, 2018, 6 pages.

*Primary Examiner* — Meng Li
(74) *Attorney, Agent, or Firm* — David Postolski, Esq.; Gearhart Law LLC

(57) ABSTRACT

A method for providing a virtual asset service based on a DID (decentralized identifier) is provided. The method includes steps of: a service providing server (a) if VADs (virtual asset addresses) are registered as a whitelist and if virtual asset transmission is requested, (a1) transmitting the virtual asset from a sender's VAD to a first VAD, (a2) if the first VAD is not registered, allowing a sender's device to request for registration of receiver's KYC, transmit or register a receiver's signature to the service providing server or in a data hub, and (3) transmit a receiver's DID to the service providing server; and (b) (i) acquiring a receiver's public key and a second VAD, or acquiring the signature from the data hub (ii) verifying the signature and the first VAD, and (iii) if the first and the second VADs are identical, registering the first VAD and transmitting the virtual asset.

20 Claims, 7 Drawing Sheets

(51) Int. Cl.
- *H04L 9/30* (2006.01)
- *G06Q 30/00* (2012.01)
- *G06Q 40/04* (2012.01)
- *G06Q 20/38* (2012.01)
- *G06Q 20/40* (2012.01)
- *G06Q 50/26* (2012.01)
- *H04L 29/08* (2006.01)

(52) U.S. Cl.
CPC ..... *G06Q 20/4014* (2013.01); *G06Q 30/0185* (2013.01); *G06Q 40/04* (2013.01); *G06Q 50/265* (2013.01); *H04L 9/30* (2013.01); *H04L 63/0884* (2013.01); *G06Q 2220/00* (2013.01); *H04L 67/104* (2013.01); *H04L 2209/38* (2013.01); *H04L 2209/56* (2013.01)

(58) Field of Classification Search
CPC .............. H04L 67/104; G06Q 30/0185; G06Q 20/3829; G06Q 50/265; G06Q 40/04; G06Q 20/3825; G06Q 20/4014; G06Q 2220/00

See application file for complete search history.

(56) References Cited

U.S. PATENT DOCUMENTS

| | | | |
|---|---|---|---|
| 2018/0204213 A1* | 7/2018 | Zappier | H04L 63/10 |
| 2018/0248699 A1* | 8/2018 | Andrade | H04L 9/0897 |
| 2019/0230092 A1* | 7/2019 | Patel | H04L 9/0637 |
| 2019/0251199 A1* | 8/2019 | Klianev | G06Q 40/04 |
| 2019/0340607 A1* | 11/2019 | Lynn | G06Q 20/3829 |
| 2020/0013055 A1* | 1/2020 | Sandor | G06Q 20/3674 |
| 2020/0177560 A1* | 6/2020 | Todd | H04L 12/66 |

FOREIGN PATENT DOCUMENTS

| | | |
|---|---|---|
| KR | 10-1903620 B1 | 10/2018 |
| KR | 10-1936759 B1 | 1/2019 |

* cited by examiner

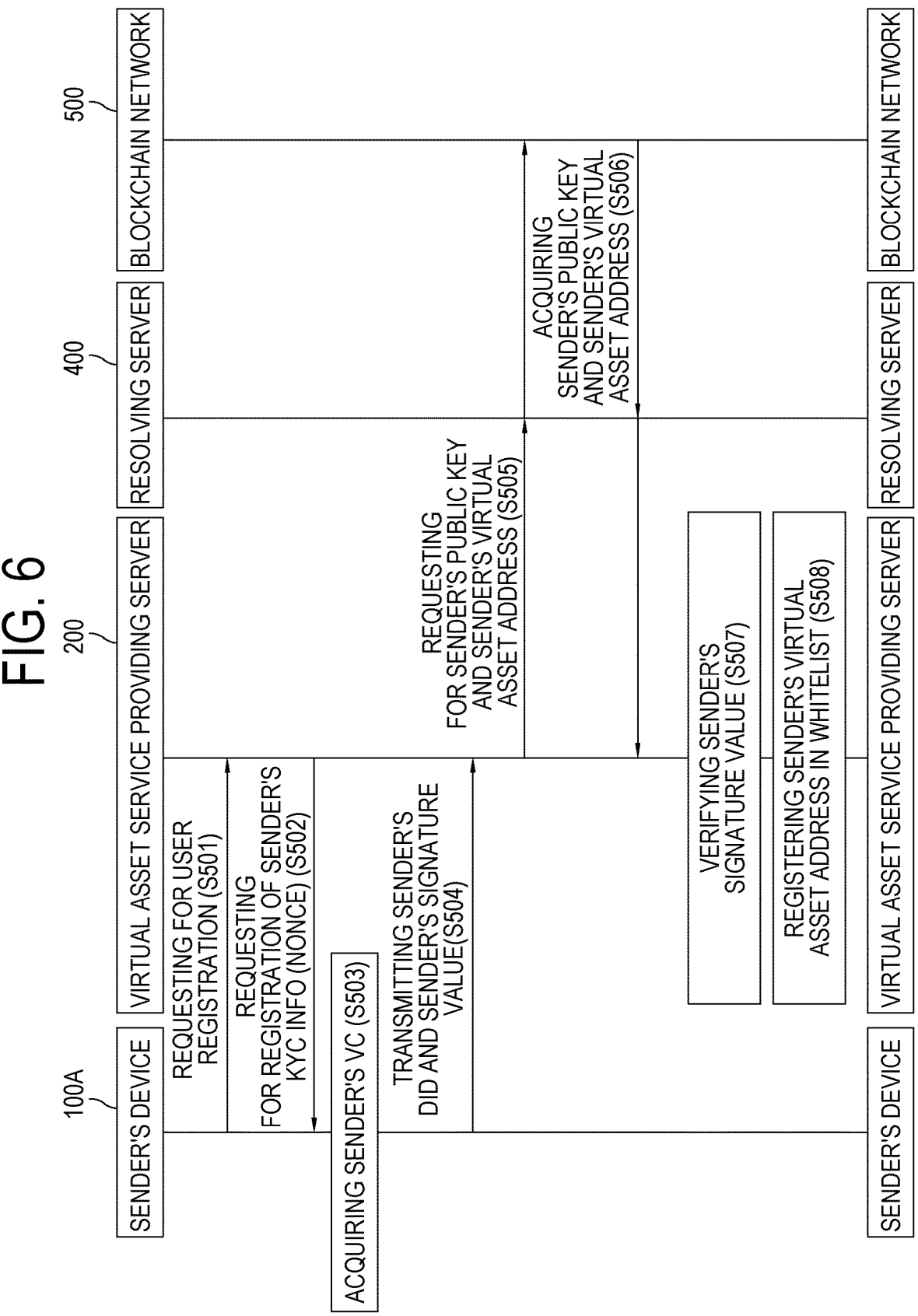

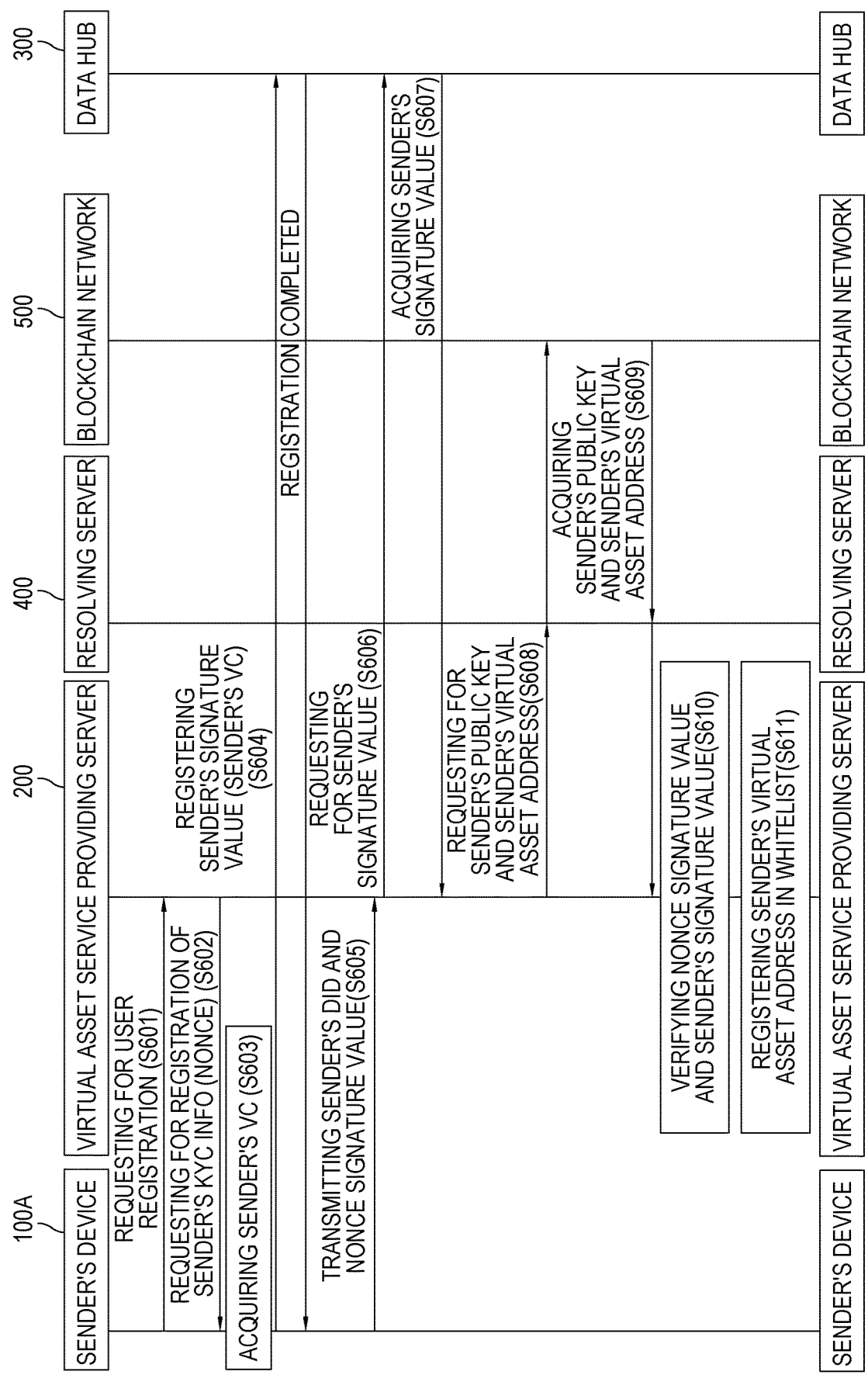

METHOD FOR PROVIDING VIRTUAL ASSET SERVICE BASED ON DECENTRALIZED IDENTIFIER AND VIRTUAL ASSET SERVICE PROVIDING SERVER USING THEM

This application claims priority to Korean Application No. 10-2020-0076078, filed Jun. 22, 2020, which claims priority to Korean Provisional Application No. 10-2019-0080350, filed Jul. 3, 2019, both of which disclosures are incorporated herein by reference.

FIELD OF THE DISCLOSURE

The present disclosure relates to a method for providing virtual asset services and a virtual asset service providing server using the same; and more particularly, to the method for providing the virtual asset services based on decentralized identifiers to prevent money laundering with virtual assets and the virtual asset service providing server using the same.

BACKGROUND OF THE DISCLOSURE

Bitcoin, a kind of virtual asset that is cryptocurrency, not only shows high demand in a market by disrupting a definition of fiat money issued by a central bank, but also has a ripple effect that forces existing services to adopt a blockchain.

The Bitcoin combines cryptography and network technologies through distributed ledger technology called the blockchain, where multiple computers simultaneously record and verify issuance and transaction history of bitcoins over a distributed P2P network.

Since the advent of the Bitcoin, various virtual assets such as Ethereum and Ripple using the blockchain technology have been generated.

In addition, a virtual asset exchange, which is a marketplace for allowing specific virtual assets to be traded with the fiat money or other virtual assets, has been created, and the various virtual assets are traded through various virtual asset exchanges worldwide.

Meanwhile, due to the nature of the virtual assets using the blockchain, it is difficult to specify an actual user of a certain virtual asset address.

Accordingly, there is a problem of money laundering with the transactions of the virtual assets while making bad use of the difficulty in specifying the actual user. That is, the source or ownership of illegal profits is concealed such that the illegal profits appear as legitimate profits through the transactions of the virtual assets.

However, there is no effective way to prevent illegal money laundering with the transactions of the virtual assets.

Therefore, inventors of the present disclosure propose a method of effectively preventing the money laundering with the transactions of the virtual asset.

SUMMARY OF THE DISCLOSURE

It is an object of the present disclosure to solve all the aforementioned problems.

It is another object of the present disclosure to prevent money laundering with transactions of virtual assets.

It is still another object of the present disclosure to easily identify a user who is trying to launder money with the transactions of the virtual assets.

It is still yet another object of the present disclosure to acquire and store information on users of the transactions of the virtual assets without infringing on privacy of the users.

In accordance with one aspect of the present disclosure, there is provided a method for providing a virtual asset service based on a DID (decentralized identifier), including steps of: (a) on condition that virtual asset addresses of users have been registered and managed as a whitelist according to authentication results of KYC (know your customer) information corresponding to the users, if a request for transmission of a virtual asset is acquired from a sender's device owned by a sender who is determined as having an intention to transmit the virtual asset, wherein the request for the transmission of the virtual asset includes a first receiver's virtual asset address corresponding to a receiver who is to receive the virtual asset, and wherein a sender's virtual asset address has already been registered in the whitelist, a virtual asset service providing server performing or supporting another device to perform (a1) a process of determining whether the first receiver's virtual asset address is registered in the whitelist, (a2) if the first receiver's virtual asset address is determined as registered in the whitelist, a process of transmitting the virtual asset from the sender's virtual asset address to the first receiver's virtual asset address, (a3) if the first receiver's virtual asset address is determined as not registered in the whitelist, one of (i) (1_1)-st processes of allowing the sender's device to (i-1) transmit a request for registration of receiver's KYC information to a receiver's device, to thereby allow the receiver's device to acquire a receiver's VC (verifiable credential) from an authentication server, wherein the authentication server creates the receiver's VC by authenticating the receiver's KYC information, (i-2) acquire a receiver's DID and a receiver's signature value from the receiver's device wherein the receiver's signature value is created by signing the receiver's VC with a receiver's private key, and (i-3) transmit the receiver's DID and the receiver's signature value to the virtual asset service providing server and (ii) (1_2)-nd processes of allowing the sender's device to (ii-1) transmit the request for the registration of the receiver's KYC information to the receiver's device, to thereby allow the receiver's device to acquire the receiver's VC from the authentication server and thus to register the receiver's signature value in a data hub, wherein the receiver's signature value is created by signing the receiver's VC with the receiver's private key, (ii-2) acquire the receiver's DID from the receiver's device, and (ii-3) transmit the receiver's DID to the virtual asset service providing server; and (b) the virtual asset service providing server performing or supporting another device to perform (b1) one of (i) (2_1)-st processes of (i-1) acquiring a receiver's public key and a second receiver's virtual asset address from a blockchain network by referring to the receiver's DID, wherein the receiver's DID is obtained from the receiver's device during the (1_1)-st processes and wherein the receiver's public key and the second receiver's virtual asset address correspond to the receiver, or allowing a resolving server to acquire the receiver's public key and the second receiver's virtual asset address from the blockchain network by referring to the receiver's DID, and (i-2) verifying the receiver's signature value and the first receiver's virtual asset address by using the receiver's public key and the second receiver's virtual asset address, and (ii) (2_2)-nd processes of (ii-1) acquiring the receiver's signature value from the data hub by referring to the receiver's DID, wherein the receiver's DID is obtained from the receiver's device during the (1_2)-nd processes, (ii-2) acquiring the receiver's public key and the second receiver's virtual asset address from the blockchain network by referring to the receiver's DID, wherein the receiver's public key and the second receiver's virtual asset address correspond to the receiver, or allowing the resolving server to acquire the receiver's public key and the second receiver's virtual asset address from the blockchain network by referring to the receiver's DID, and (ii-3) verifying the receiver's signature value and the first receiver's virtual asset address by using the receiver's public key and the second receiver's virtual asset address, and (b2) if the receiver's signature value is verified and if the first receiver's virtual asset address is determined as identical to the second receiver's virtual asset address, a process of registering the first receiver's virtual asset address in the whitelist, and a process of transmitting the virtual asset from the sender's virtual asset address to the first receiver's virtual asset address.

As one example, the receiver's VC includes (i) the receiver's KYC information, (ii) an authentication server's signature value created by signing the receiver's KYC information with an authentication server's private key, and (iii) an authentication server's DID, and wherein, at the step of (b), the virtual asset service providing server performs or supports another device to perform (i) a process of decrypting the receiver's signature value with the receiver's public key, to thereby acquire the receiver's VC, (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and (iii) a process of decrypting the receiver's VC with the authentication server's public key, to thereby verify the receiver's KYC information.

As one example, the virtual asset service providing server performs or supports another device to perform a process of allowing the resolving server to acquire an authentication server's DID document from the blockchain network by referring to the authentication server's DID, and a process of acquiring the authentication server's public key from the authentication server's DID document.

As one example, at the step of (a), the virtual asset service providing server performs or supports another device to perform (i) a process of transmitting a nonce to the sender's device, (ii) (ii-1) during the (1_1)-st processes, a process of allowing the sender's device to transmit the nonce to the receiver's device, to thereby allow the receiver's device to add the nonce to the receiver's VC and thus to generate the receiver's signature value, a process of acquiring the receiver's DID and the receiver's signature value from the receiver's device, and a process of transmitting the receiver's DID and the receiver's signature value to the virtual asset service providing server or (ii-2) during the (1_2)-nd processes, a process of allowing the sender's device to transmit the nonce to the receiver's device, to thereby allow the receiver's device to sign the nonce with the receiver's private key and thus to generate a nonce signature value, a process of acquiring the receiver's DID and the nonce signature value from the receiver's device, and a process of transmitting the receiver's DID and the nonce signature value to the virtual asset service providing server, and wherein, at the step of (b), the virtual asset service providing server performs or supports another device to perform (i) a process of decrypting the receiver's signature value with the receiver's public key, to thereby acquire the nonce and thus verify the receiver's signature value during the (2_1)-st processes or (ii) a process of decrypting the nonce signature value with the receiver's public key, to thereby verify the nonce signature value during the (2_2)-nd processes.

As one example, at the step of (b), the virtual asset service providing server performs or supports another device to perform a process of allowing the resolving server to acquire a receiver's DID document from the blockchain network by referring to the receiver's DID, and a process of acquiring the receiver's public key and the second receiver's virtual asset address from the receiver's DID document.

As one example, before the step of (a), the method further comprises steps of: (a01) if a request for user registration is acquired from the sender's device, the virtual asset service providing server performing or supporting another device to perform (i) a process of transmitting a request for registration of sender's KYC information to the sender's device wherein the request for the registration of the sender's KYC information includes a nonce, and (ii) (ii-1) (3_1)-st processes of (1) allowing the sender's device to acquire a sender's VC from the authentication server, wherein the authentication server creates the sender's VC by authenticating the sender's KYC information, and (2) transmitting a sender's DID and a sender's signature value to the virtual asset service providing server, wherein the sender's signature value is created by signing the nonce and the sender's VC with a sender's private key or (ii-2) (3_2)-nd processes of (1) allowing the sender's device to acquire the sender's VC from the authentication server, wherein the authentication server creates the sender's VC by authenticating the sender's KYC information, (2) registering the sender's signature value, created by signing the sender's VC with the sender's private key, in the data hub, and (3) transmitting the sender's DID and the nonce signature value to the virtual asset service providing server, wherein the nonce signature value is created by signing the nonce with the sender's private key; and (a02) the virtual asset service providing server performing or supporting another device to perform (i) one of (i-1) (4_1)-st processes of (1) acquiring a sender's public key and the sender's virtual asset address from the blockchain network by referring to the sender's DID, wherein the sender's DID is obtained from the sender's device during the (3_1)-st processes and wherein the sender's public key and the sender's virtual asset address correspond to the sender, or allowing the resolving server to acquire the sender's public key and the sender's virtual asset address from the blockchain network by referring to the sender's DID, and (2) verifying the sender's signature value by using the sender's public key, and (i-2) (4_2)-nd processes of (1) acquiring the sender's signature value from the data hub by referring to the sender's DID, wherein the sender's DID is obtained from the sender's device during the (3_2)-nd processes, (2) acquiring the sender's public key and the sender's virtual asset address from the blockchain network by referring to the sender's DID, or allowing the resolving server to acquire the sender's public key and the sender's virtual asset address from the blockchain network by referring to the sender's DID, and (3) verifying the nonce signature value and the sender's signature value by using the sender's public key, and (ii) if the sender's signature value is verified or if the nonce signature value and the sender's signature value are verified, a process of registering the sender's virtual asset address in the whitelist.

As one example, the sender's VC includes (i) the sender's KYC information, (ii) an authentication server's signature value created by signing the sender's KYC information with an authentication server's private key, and (iii) an authentication server's DID, and wherein, at the step of (a02), the virtual asset service providing server performs or supports another device to perform (i) a process of decrypting the sender's signature value with the sender's public key, to thereby acquire the sender's VC, (ii) (ii-1) a process of acquiring an authentication server's public key from the blockchain network by referring to the authentication server's DID included in the sender's VC or (ii-2) a process of allowing the resolving server to acquire the authentication server's public key from the blockchain network by referring to the authentication server's DID, and (iii) a process of decrypting the sender's VC with the authentication server's public key, to thereby verify the sender's KYC information and thus further verify the sender's signature value.

As one example, the virtual asset service providing server performs or supports another device to perform a process of allowing the resolving server to acquire an authentication server's DID document from the blockchain network by referring to the authentication server's DID, and a process of acquiring the authentication server's public key from the authentication server's DID document.

In accordance with another aspect of the present disclosure, there is provided a method for providing a virtual asset service based on a decentralized identifier (DID), including steps of: (a) on condition that virtual asset addresses of users have been registered and managed as a whitelist according to authentication results of KYC (know your customer) information corresponding to the users, if a request for transmission of a virtual asset is acquired from a sender's device owned by a sender who is determined as having an intention to send the virtual asset, wherein the request for the transmission of the virtual asset includes a first receiver's virtual asset address, corresponding to a receiver who is to receive the virtual asset, and wherein a sender's virtual asset address has already been registered in the whitelist, a virtual asset service providing server performing or supporting another device to perform (a1) a process of determining whether the first receiver's virtual asset address is registered in the whitelist, (a2) if the first receiver's virtual asset address is determined as registered in the whitelist, a process of transmitting the virtual asset from the sender's virtual asset address to the first receiver's virtual asset address, and (a3) (i) if the first receiver's virtual asset address is determined as not registered in the whitelist, a process of allowing the sender's device to transmit a request for registration of receiver's KYC information to a receiver's device, (ii) if a request for receiver registration is acquired from the receiver's device in response to the request for the registration of the receiver's KYC information, a process of transmitting a request for the receiver's KYC information to the receiver's device, wherein the request for the receiver's KYC information includes a nonce, and (iii) one of (iii-1) (5_1)-st processes of allowing the receiver's device to (1) acquire a receiver's VC (verifiable credential) from an authentication server, wherein the authentication server creates the receiver's VC by authenticating the receiver's KYC information, and (2) transmit a receiver's DID and a first receiver's signature value to the virtual asset service providing server, wherein the first receiver's signature value is created by signing the receiver's VC and the nonce with a receiver's private key, and (iii-2) (5_2)-nd processes of allowing the receiver's device to (1) acquire the receiver's VC from the authentication server, wherein the authentication server creates the receiver's VC by authenticating the receiver's KYC information, (2) register a second receiver's signature value, created by signing the receiver's VC with the receiver's private key, in a data hub, and (3) transmit the receiver's DID and a nonce signature value to the virtual asset service providing server, wherein the nonce signature value is created by signing the nonce with the receiver's private key; and (b) the virtual asset service providing server performing or supporting another device to perform (b1) one of (i) (6_1)-st processes of (i-1) acquiring a receiver's public key and a second receiver's virtual asset address from a blockchain network by referring to the receiver's DID, wherein the receiver's DID is obtained from the receiver's device during the (5_1)-st processes and wherein the receiver's public key and the second receiver's virtual asset address correspond to the receiver, or allowing a resolving server to acquire the receiver's public key and the second receiver's virtual asset address from the blockchain network by referring to the receiver's DID, and (i-2) verifying the first receiver's signature value and the first receiver's virtual asset address by using the receiver's public key and the second receiver's virtual asset address, and (ii) (6_2)-nd processes of (ii-1) acquiring the second receiver's signature value from the data hub by referring to the receiver's DID, wherein the receiver's DID is obtained from the receiver's device during the (5_2)-nd processes, (ii-2) acquiring the receiver's public key and the second receiver's virtual asset address from the blockchain network by referring to the receiver's DID, or allowing the resolving server to acquire the receiver's public key and the second receiver's virtual asset address from the blockchain network by referring to the receiver's DID, and (ii-3) verifying the nonce signature value, the receiver's signature value and the first receiver's virtual asset address by using the receiver's public key and the second receiver's virtual asset address, and (b2) (1) if the first receiver's signature value is verified and if the first receiver's virtual asset address is determined as identical to the second receiver's virtual asset address or (2) if the nonce signature value and the second receiver's signature value are verified and if the first receiver's virtual asset address is determined as identical to the second receiver's virtual asset address, a process of registering the first receiver's virtual asset address in the whitelist, and a process of transmitting the virtual asset from the sender's virtual asset address to the first receiver's virtual asset address.

As one example, the receiver's VC includes (i) the receiver's KYC information, (ii) an authentication server's signature value created by signing the receiver's KYC information with an authentication server's private key, and (iii) an authentication server's DID, and wherein, at the step of (b), the virtual asset service providing server performs or supports another device to perform (i) a process of decrypting the first receiver's signature value or the second receiver's signature value with the receiver's public key, to thereby acquire the receiver's VC, (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and (iii) a process of decrypting the receiver's VC with the authentication server's public key, to thereby verify the receiver's KYC information.

In accordance with still another aspect of the present disclosure, there is provided a virtual asset service providing server for providing a virtual asset service based on a DID (decentralized identifier), including: at least one memory that stores instructions; and at least one processor configured to execute the instructions to perform or support another device to perform: (I) on condition that virtual asset addresses of users have been registered and managed as a whitelist according to authentication results of KYC (know your customer) information corresponding to the users, if a request for transmission of a virtual asset is acquired from a sender's device owned by a sender who is determined as having an intention to transmit the virtual asset, wherein the request for the transmission of the virtual asset includes a first receiver's virtual asset address corresponding to a receiver who is to receive the virtual asset, and wherein a sender's virtual asset address has already been registered in the whitelist, (I-1) a process of determining whether the first receiver's virtual asset address is registered in the whitelist, (I-2) if the first receiver's virtual asset address is determined as registered in the whitelist, a process of transmitting the virtual asset from the sender's virtual asset address to the first receiver's virtual asset address, (I-3) if the first receiver's virtual asset address is determined as not registered in the whitelist, one of (i) (1_1)-st processes of allowing the sender's device to (i-1) transmit a request for registration of receiver's KYC information to a receiver's device, to thereby allow the receiver's device to acquire a receiver's VC (verifiable credential) from an authentication server, wherein the authentication server creates the receiver's VC by authenticating receiver's KYC information, (i-2) acquire a receiver's DID and a receiver's signature value from the receiver's device wherein the receiver's signature value is created by signing the receiver's VC with a receiver's private key, and (i-3) transmit the receiver's DID and the receiver's signature value to the virtual asset service providing server and (ii) (1_2)-nd processes of allowing the sender's device to (ii-1) transmit the request for the registration of the receiver's KYC information to the receiver's device, to thereby allow the receiver's device to acquire the receiver's VC from the authentication server and thus to register the receiver's signature value in a data hub, wherein the receiver's signature value is created by signing the receiver's VC with the receiver's private key, (ii-2) acquire the receiver's DID from the receiver's device, and (ii-3) transmit the receiver's DID to the virtual asset service providing server, and (II) (II-1) one of (i) (2_1)-st processes of (i-1) acquiring a receiver's public key and a second receiver's virtual asset address from a blockchain network by referring to the receiver's DID, wherein the receiver's DID is obtained from the receiver's device during the (1_1)-st processes and wherein the receiver's public key and the second receiver's virtual asset address correspond to the receiver, or allowing a resolving server to acquire the receiver's public key and the second receiver's virtual asset address from the blockchain network by referring to the receiver's DID, and (i-2) verifying the receiver's signature value and the first receiver's virtual asset address by using the receiver's public key and the second receiver's virtual asset address, and (ii) (2_2)-nd processes of (ii-1) acquiring the receiver's signature value from the data hub by referring to the receiver's DID, wherein the receiver's DID is obtained from the receiver's device during the (1_2)-nd processes, (ii-2) acquiring the receiver's public key and the second receiver's virtual asset address from the blockchain network by referring to the receiver's DID, wherein the receiver's public key and the second receiver's virtual asset address correspond to the receiver, or allowing the resolving server to acquire the receiver's public key and the second receiver's virtual asset address from the blockchain network by referring to the receiver's DID, and (ii-3) verifying the receiver's signature value and the first receiver's virtual asset address by using the receiver's public key and the second receiver's virtual asset address, and (II-2) if the receiver's signature value is verified and if the first receiver's virtual asset address is determined as identical to the second receiver's virtual asset address, a process of registering the first receiver's virtual asset address in the whitelist, and a process of transmitting the virtual asset from the sender's virtual asset address to the first receiver's virtual asset address.

As one example, the receiver's VC includes (i) the receiver's KYC information, (ii) an authentication server's signature value created by signing the receiver's KYC information with an authentication server's private key, and (iii) an authentication server's DID, and wherein, at the process of (II), the processor performs or supports another device to perform (i) a process of decrypting the receiver's signature value with the receiver's public key, to thereby acquire the receiver's VC, (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and (iii) a process of decrypting the receiver's VC with the authentication server's public key, to thereby verify the receiver's KYC information.

As one example, the processor performs or supports another device to perform a process of allowing the resolving server to acquire an authentication server's DID document from the blockchain network by referring to the authentication server's DID, and a process of acquiring the authentication server's public key from the authentication server's DID document.

As one example, at the process of (I), the processor performs or supports another device to perform (i) a process of transmitting a nonce to the sender's device, (ii) (ii-1) during the (1_1)-st processes, a process of allowing the sender's device to transmit the nonce to the receiver's device, to thereby allow the receiver's device to add the nonce to the receiver's VC and thus to generate the receiver's signature value, a process of acquiring the receiver's DID and the receiver's signature value from the receiver's device, and a process of transmitting the receiver's DID and the receiver's signature value to the virtual asset service providing server or (ii-2) during the (1_2)-nd processes, a process of allowing the sender's device to transmit the nonce to the receiver's device, to thereby allow the receiver's device to sign the nonce with the receiver's private key and thus to generate a nonce signature value, a process of acquiring the receiver's DID and the nonce signature value from the receiver's device, and a process of transmitting the receiver's DID and the nonce signature value to the virtual asset service providing server, and wherein, at the process of (II), the processor performs or supports another device to perform (i) a process of decrypting the receiver's signature value with the receiver's public key, to thereby acquire the nonce and thus verify the receiver's signature value during the (2_1)-st processes or (ii) a process of decrypting the nonce signature value with the receiver's public key, to thereby verify the nonce signature value during the (2_2)-nd processes.

As one example, at the process of (II), the processor performs or supports another device to perform a process of allowing the resolving server to acquire a receiver's DID document from the blockchain network by referring to the receiver's DID, and a process of acquiring the receiver's public key and the second receiver's virtual asset address from the receiver's DID document.

As one example, before the process of (I), the processor further performs or supports another device to perform: (I01) if a request for user registration is acquired from the sender's device, (i) a process of transmitting a request for registration of sender's KYC information to the sender's device wherein the request for the registration of the sender's KYC information includes a nonce, and (ii) (ii-1) (3_1)-st processes of (1) allowing the sender's device to acquire a sender's VC from the authentication server, wherein the authentication server creates the sender's VC by authenticating the sender's KYC information, and (2) transmitting a sender's DID and a sender's signature value to the virtual asset service providing server, wherein the sender's signature value is created by signing the nonce and the sender's VC with a sender's private key or (ii-2) (3_2)-nd processes of (1) allowing the sender's device to acquire the sender's VC from the authentication server, wherein the authentication server creates the sender's VC by authenticating the sender's KYC information, (2) registering the sender's signature value, created by signing the sender's VC with the sender's private key, in the data hub, and (3) transmitting the sender's DID and the nonce signature value to the virtual asset service providing server, wherein the nonce signature value is created by signing the nonce with the sender's private key; and (I02) (i) one of (i-1) (4_1)-st processes of (1) acquiring a sender's public key and the sender's virtual asset address from the blockchain network by referring to the sender's DID, wherein the sender's DID is obtained from the sender's device during the (3_1)-st processes and wherein the sender's public key and the sender's virtual asset address correspond to the sender, or allowing the resolving server to acquire the sender's public key and the sender's virtual asset address from the blockchain network by referring to the sender's DID, and (2) verifying the sender's signature value by using the sender's public key, and (i-2) (4_2)-nd processes of (1) acquiring the sender's signature value from the data hub by referring to the sender's DID, wherein the sender's DID is obtained from the sender's device during the (3_2)-nd processes, (2) acquiring the sender's public key and the sender's virtual asset address from the blockchain network by referring to the sender's DID, or allowing the resolving server to acquire the sender's public key and the sender's virtual asset address from the blockchain network by referring to the sender's DID, and (3) verifying the nonce signature value and the sender's signature value by using the sender's public key, and (ii) if the sender's signature value is verified or if the nonce signature value and the sender's signature value are verified, a process of registering the sender's virtual asset address in the whitelist.

As one example, the sender's VC includes (i) the sender's KYC information, (ii) an authentication server's signature value created by signing the sender's KYC information with an authentication server's private key, and (iii) an authentication server's DID, and wherein, at the process of (I02), the processor performs or supports another device to perform (i) a process of decrypting the sender's signature value with the sender's public key, to thereby acquire the sender's VC, (ii) (ii-1) a process of acquiring an authentication server's public key from the blockchain network by referring to the authentication server's DID included in the sender's VC or (ii-2) a process of allowing the resolving server to acquire the authentication server's public key from the blockchain network by referring to the authentication server's DID, and (iii) a process of decrypting the sender's VC with the authentication server's public key, to thereby verify the sender's KYC information and thus further verify the sender's signature value.

As one example, the processor performs or supports another device to perform a process of allowing the resolving server to acquire an authentication server's DID document from the blockchain network by referring to the authentication server's DID, and a process of acquiring the authentication server's public key from the authentication server's DID document.

In accordance with still yet another aspect of the present disclosure, there is provided a virtual asset service providing server for providing a virtual asset service based on a decentralized identifier (DID), including: at least one memory that stores instructions; and at least one processor configured to execute the instructions to perform or support another device to perform: (I) on condition that virtual asset addresses of users have been registered and managed as a whitelist according to authentication results of KYC (know your customer) information corresponding to the users, if a request for transmission of a virtual asset is acquired from a sender's device owned by a sender who is determined as having an intention to send the virtual asset, wherein the request for the transmission of the virtual asset includes a first receiver's virtual asset address, corresponding to a receiver who is to receive the virtual asset, and wherein a sender's virtual asset address has already been registered in the whitelist, (I-1) a process of determining whether the first receiver's virtual asset address is registered in the whitelist, (I-2) if the first receiver's virtual asset address is determined as registered in the whitelist, a process of transmitting the virtual asset from the sender's virtual asset address to the first receiver's virtual asset address, and (I-3) (i) if the first receiver's virtual asset address is determined as not registered in the whitelist, a process of allowing the sender's device to transmit a request for registration of receiver's KYC information to a receiver's device, (ii) if a request for receiver registration is acquired from the receiver's device in response to the request for the registration of the receiver's KYC information, a process of transmitting a request for the receiver's KYC information to the receiver's device, wherein the request for the receiver's KYC information includes a nonce, and (iii) one of (iii-1) (5_1)-st processes of allowing the receiver's device to (1) acquire a receiver's VC (verifiable credential) from an authentication server, wherein the authentication server creates the receiver's VC by authenticating the receiver's KYC information, and (2) transmit a receiver's DID and a first receiver's signature value to the virtual asset service providing server, wherein the first receiver's signature value is created by signing the receiver's VC and the nonce with a receiver's private key, and (iii-2) (5_2)-nd processes of allowing the receiver's device to (1) acquire the receiver's VC from the authentication server, wherein the authentication server creates the receiver's VC by authenticating the receiver's KYC information, (2) register a second receiver's signature value, created by signing the receiver's VC with the receiver's private key, in a data hub, and (3) transmit the receiver's DID and a nonce signature value to the virtual asset service providing server, wherein the nonce signature value is created by signing the nonce with the receiver's private key and (II) (II-1) one of (i) (6_1)-st processes of (i-1) acquiring a receiver's public key and a second receiver's virtual asset address from a blockchain network by referring to the receiver's DID, wherein the receiver's DID is obtained from the receiver's device during the (5_1)-st processes and wherein the receiver's public key and the second receiver's virtual asset address correspond to the receiver, or allowing a resolving server to acquire the receiver's public key and the second receiver's virtual asset address from the blockchain network by referring to the receiver's DID, and (i-2) verifying the first receiver's signature value and the first receiver's virtual asset address by using the receiver's public key and the second receiver's virtual asset address, and (ii) (6_2)-nd processes of (ii-1) acquiring the second receiver's signature value from the data hub by referring to the receiver's DID, wherein the receiver's DID is obtained from the receiver's device during the (5_2)-nd processes, (ii-2) acquiring the receiver's public key and the second receiver's virtual asset address from the blockchain network by referring to the receiver's DID, or allowing the resolving server to acquire the receiver's public key and the second receiver's virtual asset address from the blockchain network by referring to the receiver's DID, and (ii-3) verifying the nonce signature value, the receiver's signature value and the first receiver's virtual asset address by using the receiver's public key and the second receiver's virtual asset address, and (II-2) (1) if the first receiver's signature value is verified and if the first receiver's virtual asset address is determined as identical to the second receiver's virtual asset address or (2) if the nonce signature value and the second receiver's signature value are verified and if the first receiver's virtual asset address is determined as identical to the second receiver's virtual asset address, a process of registering the first receiver's virtual asset address in the whitelist, and a process of transmitting the virtual asset from the sender's virtual asset address to the first receiver's virtual asset address.

As one example, the receiver's VC includes (i) the receiver's KYC information, (ii) an authentication server's signature value created by signing the receiver's KYC information with an authentication server's private key, and (iii) an authentication server's DID, and wherein, at the process of (II), the processor performs or supports another device to perform (i) a process of decrypting the first receiver's signature value or the second receiver's signature value with the receiver's public key, to thereby acquire the receiver's VC, (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and (iii) a process of decrypting the receiver's VC with the authentication server's public key, to thereby verify the receiver's KYC information.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which:

FIG. 6 is a drawing schematically illustrating a process of registering a user in the method for providing the virtual asset service based on the decentralized identifiers in accordance with one example embodiment of the present disclosure.

FIG. 7 is a drawing schematically illustrating another process of registering the user in the method for providing the virtual asset service based on the decentralized identifiers in accordance with one example embodiment of the present disclosure.

DETAILED DESCRIPTION OF THE PREFERRED EMBODIMENTS

Figure 1:
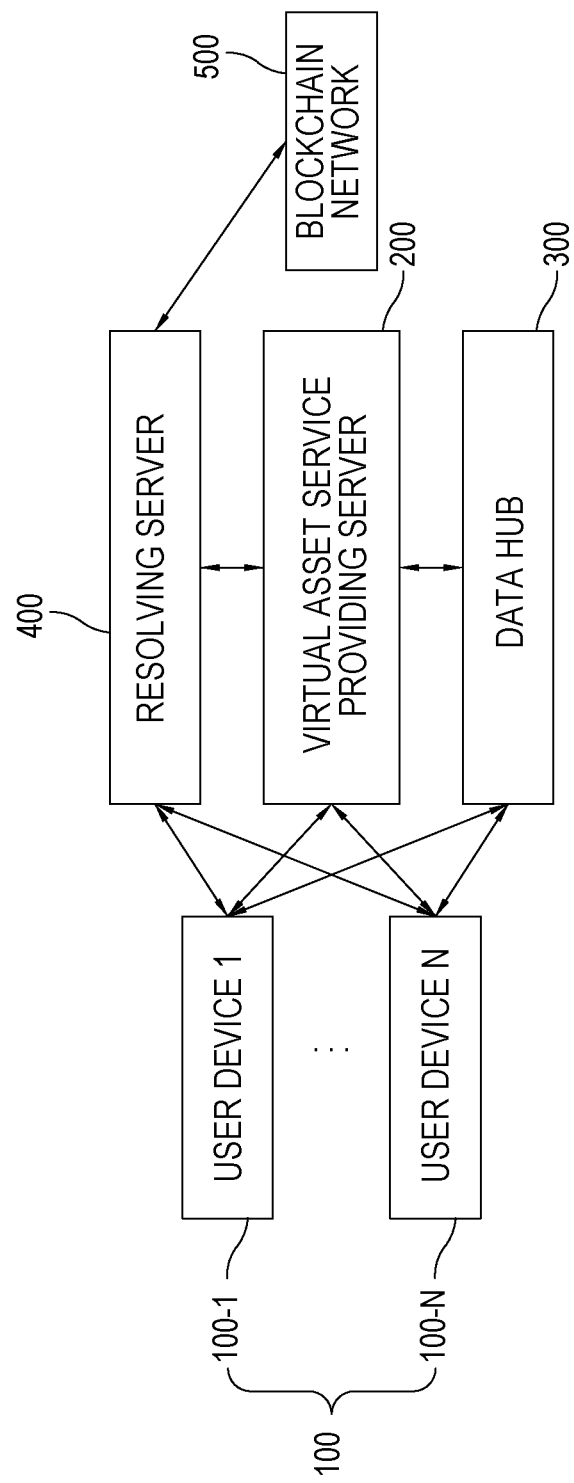
FIG. 1 is a drawing schematically illustrating a system for providing a virtual asset service based on decentralized identifiers in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below.

FIG. 1 is a drawing schematically illustrating a system for providing a virtual asset service based on decentralized identifiers in accordance with one example embodiment of the present disclosure. The system may include user devices 100, a virtual asset service providing server 200, a data hub 300, a resolving server 400, and a blockchain network 500.

First, the user devices 100 may be owned by users who have intentions to perform transactions of virtual assets. A user device may store a user's VC (verifiable credential). Herein, an authentication server may create the user's VC by authenticating user's KYC (know your customer) information. Also, each of the DIDs (decentralized identifiers) corresponding to each of the users may have been stored in the blockchain network.

Next, the virtual asset service providing server 200 may provide the user devices 100 with virtual asset services such as deposits, withdrawals, wire transfers, etc. of the virtual assets. To this effect, the virtual asset service providing server 200 may register virtual asset addresses of the users in a whitelist according to authentication results of the KYC information corresponding to the users and manage the virtual asset addresses, and may acquire and store information on the users who perform the transactions of the virtual assets. Herein, the virtual asset service providing server 200 may include a memory (not illustrated) for storing instructions to provide the virtual asset services based on the DIDs, and a processor (not illustrated) for performing processes of providing the virtual asset services based on the DIDs, according to the instructions stored in the memory. Herein, the virtual asset service providing server 200 may include a mobile computer, a PDA/EDA (personal/enterprise digital assistant), a mobile phone, a smart-phone, a tablet, and a server, but the scope of the present invention is not limited thereto, and may include any computing device which performs computational operation, such as a digital camera, a personal navigation device, and a mobile gaming device capable of wired and wireless communication, etc.

Specifically, the virtual asset service providing server 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (operating system) and software configuration of applications that achieve specific purposes may be further included.

Next, the data hub 300 may be accessed only by authorized users with permission to access its stored data. The data hub 300 may store the data in response to a user request, or may store the data per user request in another storage such as a database. Herein, said another storage may include distributed ledgers on the blockchain network, in addition to the database, but the scope of the present disclosure is not limited thereto, and may include any storages that can store data.

Next, the resolving server 400 may acquire the data registered in the blockchain network by referring to the DIDs, and may include the computing device capable of accessing a network or may include a blockchain node in the blockchain network. Also, the resolving server 400 may be configured as a server independent of the virtual asset service providing server 200 or may be integrated into the virtual asset service providing server 200. Herein, each of the DIDs may be issued not only to each of the users, but also to each of IoT devices which is a computing device such as a server, etc.

Next, multiple blockchain nodes in the blockchain network 500 may share the distributed ledgers. The blockchain network 500 may generate the DIDs in response to requests from the users and/or the computing devices, and may store the data corresponding to the DIDs in the distributed ledgers.

Figure 2:
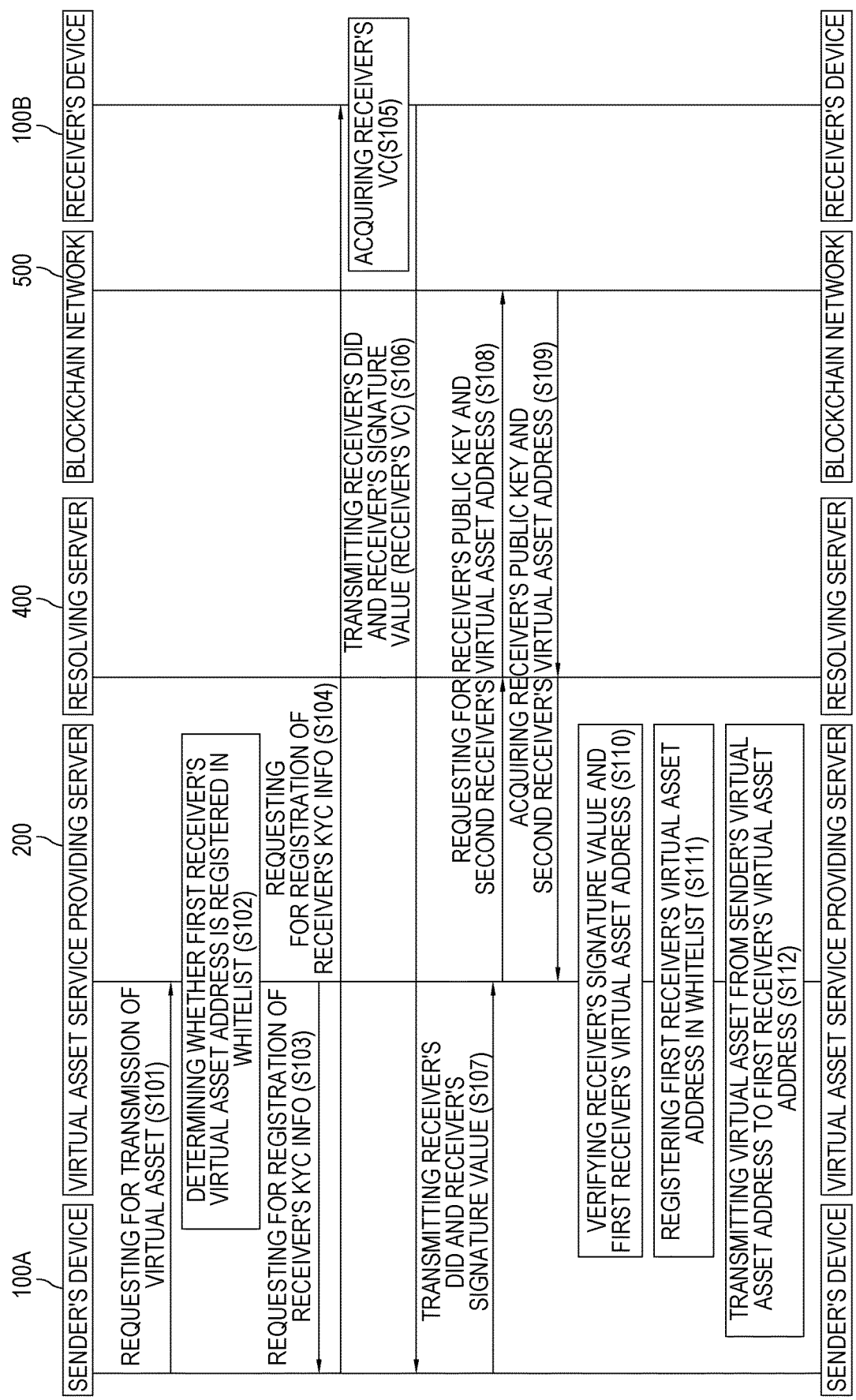
FIG. 2 is a drawing schematically illustrating a method for providing the virtual asset service based on the decentralized identifiers in accordance with one example embodiment of the present disclosure.

First, a method for providing the virtual asset services based on the DID using the system configured as such in accordance with one example embodiment of the present disclosure is described as follows by referring to FIG. 2.

A sender, who is determined as having an intention to transmit a virtual asset, may transmit a request for transmission of the virtual asset to the virtual asset service providing server 200 by using a sender's device 100*a* owned by the sender, at a step of S101. Herein, the request for the transmission of the virtual asset may include a first receiver's virtual asset address corresponding to a receiver who is to receive the virtual asset.

Herein, virtual asset addresses of the users may have been registered and managed as the whitelist by the virtual asset service providing server 200 according to the authentication results of the KYC (know your customer) information corresponding to the users, and a sender's virtual asset address may already have been registered in the whitelist.

Then, the virtual asset service providing server 200 may determine whether the first receiver's virtual asset address is registered in the whitelist, at a step of S102.

Herein, the sender's device 100*a* may transmit a sender's DID to the virtual asset service providing server 200 at a time of the request for the transmission of the virtual asset. And accordingly, the virtual asset service providing server 200 may acquire the sender's virtual asset address from the blockchain network 500 by referring to the sender's DID, and may determine whether the acquired sender's virtual asset address is registered in the whitelist, to thereby determine whether the sender is a legitimate user. As another example, the sender's device 100*a* may transmit the sender's virtual asset address to the virtual asset service providing server 200 at the time of the request for the transmission of the virtual asset, and accordingly, the virtual asset service providing server 200 may determine whether the sender's virtual asset address is registered in the whitelist, to thereby determine whether the sender is the legitimate user.

And, if the first receiver's virtual asset address is determined as registered in the whitelist, the virtual asset service providing server 200 may perform or support another device to perform a process of determining that the receiver is a legitimate user, and a process of transmitting the virtual asset, requested for the transmission, from the sender's virtual asset address to the first receiver's virtual asset address.

Meanwhile, if the first receiver's virtual asset address is determined as not registered in the whitelist, the virtual asset service providing server 200 may perform or support another device to perform a process of transmitting a request for registration of receiver's KYC information to the sender's device 100*a*, at a step of S103. Herein, the virtual asset service providing server 200 may transmit a nonce to the sender's device 100*a*.

Then, the sender's device 100*a* may transmit the request for the registration of the receiver's KYC information to a receiver's device 100*b* owned by the receiver, at a step of S104. Herein, the sender's device 100*a* may transmit the nonce, received from the virtual asset service providing server 200, to the receiver's device 100*b*.

Accordingly, the receiver's device 100*b* may transmit a request for authentication of the receiver's KYC information to the authentication server, to thereby allow the authentication server to authenticate the receiver's KYC information and to transmit the receiver's VC, corresponding to the authenticated receiver's KYC information, to the receiver's device 100*b*, and as a result, the receiver's device 100*b* may acquire the receiver's VC at a step of S105. Herein, the receiver's VC may include (i) the receiver's KYC information, (ii) an authentication server's signature value created by signing the receiver's KYC information with an authentication server's private key, and (iii) an authentication server's DID.

And, the receiver's device 100*b* may generate a receiver's signature value by signing the receiver's VC with a receiver's private key, and may transmit a receiver's DID and the receiver's signature value to the sender's device 100*a* at a step of S106. Herein, the receiver's device 100*b* may add the nonce, received from the sender's device 100*a*, to the receiver's VC, to thereby generate the receiver's signature value.

Then, the sender's device 100*a* may transmit the receiver's DID and the receiver's signature value, which are acquired from the receiver's device 100*b*, to the virtual asset service providing server 200 at a step of S107.

And, the virtual asset service providing server 200 may perform or support another device to perform (i) a process of acquiring a receiver's public key and a second receiver's virtual asset address from the blockchain network 500 by referring to the receiver's DID at steps of S108 and S109, where the receiver's DID is obtained from the receiver's device 100*b*, or (ii) a process of allowing the resolving server 400 to acquire the receiver's public key and the second receiver's virtual asset address from the blockchain network 500 by referring to the receiver's DID at the steps of S108 and S109. Herein, the virtual asset service providing server 200 may perform or support another device to perform a process of allowing the resolving server 400 to acquire a receiver's DID document from the blockchain network 500 by referring to the receiver's DID, and a process of acquiring the receiver's public key and the second receiver's virtual asset address from the receiver's DID document.

Thereafter, the virtual asset service providing server 200 may perform or support another device to perform a process of verifying the receiver's signature value and the first receiver's virtual asset address by using the receiver's public key and the second receiver's virtual asset address, at a step of S110.

That is, the virtual asset service providing server 200 may perform or support another device to perform (i) a process of decrypting the receiver's signature value with the receiver's public key, to thereby acquire the receiver's VC, (ii) (ii-1) a process of acquiring an authentication server's public key from the blockchain network 500 by referring to the authentication server's DID included in the receiver's VC, or (ii-2) a process of allowing the resolving server 400 to acquire the authentication server's public key from the blockchain network 500 by referring to the authentication server's DID, and (iii) a process of decrypting the receiver's VC with the authentication server's public key, to thereby verify the receiver's KYC information.

Herein, the virtual asset service providing server 200 may perform or support another device to perform a process of allowing the resolving server 400 to acquire an authentication server's DID document from the blockchain network 500 by referring to the authentication server's DID, and a process of acquiring the authentication server's public key from the authentication server's DID document.

Also, the virtual asset service providing server 200 may decrypt the receiver's signature value with the receiver's public key, to thereby acquire the nonce and thus verify the receiver's signature value. That is, the receiver's signature value may be verified by determining whether the nonce acquired from decrypting the receiver's signature value is identical to the nonce transmitted to the sender's device 100*a* in response to the request for the registration of the receiver's KYC information.

Thereafter, if the receiver's signature value is verified and if the first receiver's virtual asset address is determined as identical to the second receiver's virtual asset address, the virtual asset service providing server 200 may perform or support another device to perform a process of registering the first receiver's virtual asset address in the whitelist at a step of S111, and a process of transmitting the virtual asset from the sender's virtual asset address to the first receiver's virtual asset address at a step of S112.

By using the method as such, the virtual asset service providing server 200 may prevent money laundering with the virtual assets and may easily identify a user who is trying to launder money with the virtual assets by only allowing the users, whose virtual asset addresses are registered in the whitelist, to use the virtual asset services.

Figure 3:
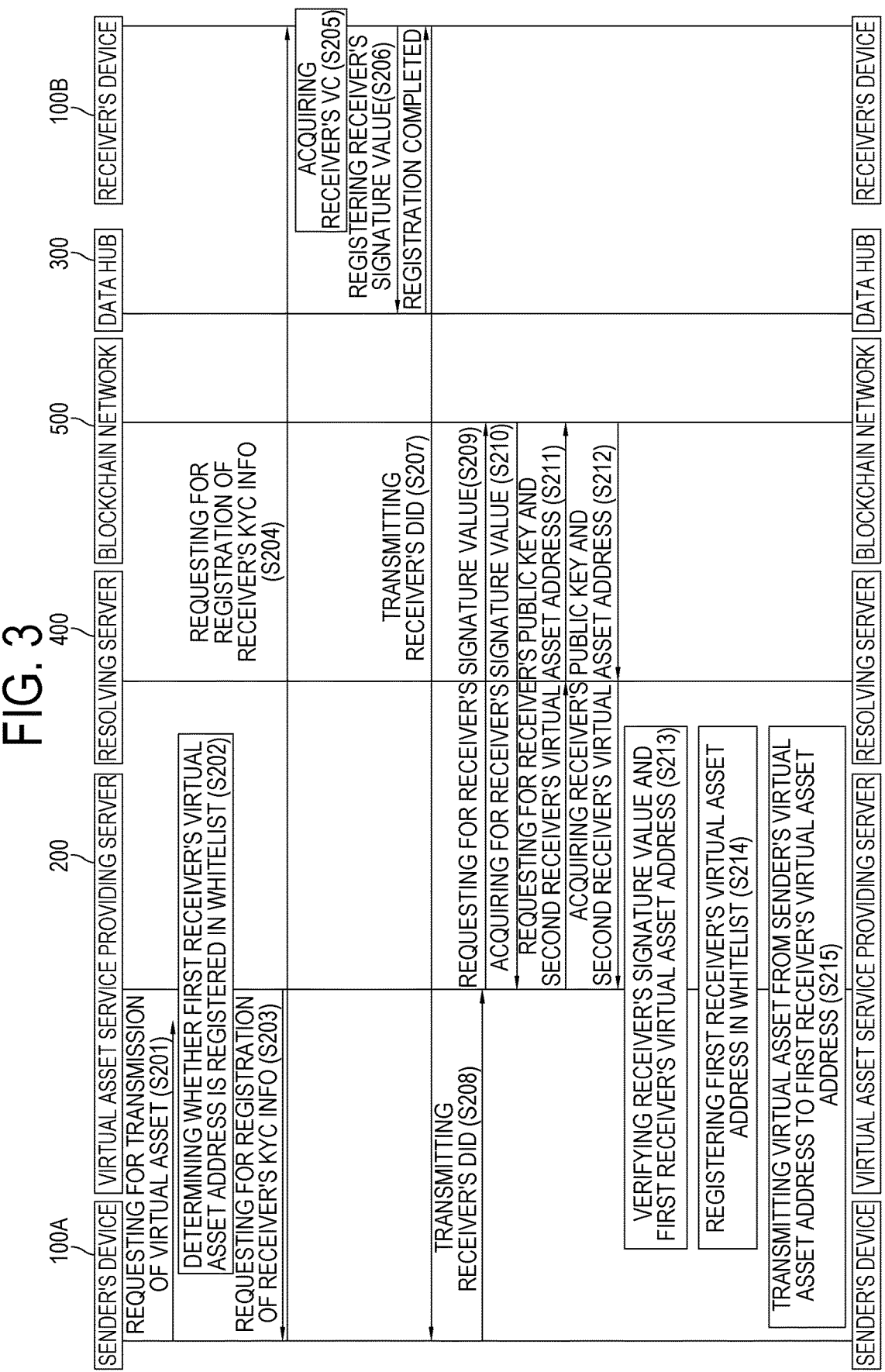
FIG. 3 is a drawing schematically illustrating a method for providing the virtual asset service based on the decentralized identifiers in accordance with another example embodiment of the present disclosure.

Next, a method for providing the virtual asset services based on the DID in accordance with another example embodiment of the present disclosure is described as follows by referring to FIG. 3. In the description below, the part easily deducible from the explanation of FIG. 2 will be omitted.

The sender, who is determined as having the intention to transmit the virtual asset, may transmit the request for the transmission of the virtual asset to the virtual asset service providing server 200 by using the sender's device 100*a* owned by the sender, at a step of S201. Herein, the request for the transmission of the virtual asset may include the first receiver's virtual asset address corresponding to the receiver who is to receive the virtual asset.

Herein, virtual asset addresses of the users may have been registered and managed as the whitelist by the virtual asset service providing server 200 according to the authentication results of the KYC (know your customer) information corresponding to the users, and a sender's virtual asset address may already have been registered in the whitelist.

Then, the virtual asset service providing server 200 may determine whether the first receiver's virtual asset address is registered in the whitelist, where the transmission of the virtual asset to the first receiver's virtual asset address is requested, at a step of S202.

Herein, the sender's device 100*a* may transmit a sender's DID to the virtual asset service providing server 200 at a time of the request for the transmission of the virtual asset, and accordingly, the virtual asset service providing server 200 may acquire the sender's virtual asset address from the blockchain network 500 by referring to the sender's DID, and may determine whether the acquired sender's virtual asset address is registered in the whitelist, to thereby determine whether the sender is a legitimate user. As another example, the sender's device 100*a* may transmit the sender's virtual asset address to the virtual asset service providing server 200 at the time of the request for the transmission of the virtual asset, and accordingly, the virtual asset service providing server 200 may determine whether the sender's virtual asset address is registered in the whitelist, to thereby determine whether the sender is the legitimate user.

And, if the first receiver's virtual asset address is determined as registered in the whitelist, the virtual asset service providing server 200 may perform or support another device to perform a process of determining that the receiver is a legitimate user, and a process of transmitting the virtual asset, requested for the transmission, from the sender's virtual asset address to the first receiver's virtual asset address.

Meanwhile, if the first receiver's virtual asset address is determined as not registered in the whitelist, the virtual asset service providing server 200 may perform or support another device to perform a process of transmitting the request for the registration of the receiver's KYC information to the sender's device 100a, at a step of S203. Herein, the virtual asset service providing server 200 may transmit a nonce to the sender's device 100a.

Then, the sender's device 100a may transmit the request for the registration of the receiver's KYC information to the receiver's device 100b owned by the receiver, at a step of S204. Herein, the sender's device 100a may transmit the nonce, received from the virtual asset service providing server 200, to the receiver's device 100b.

Accordingly, the receiver's device 100b may transmit the request for the authentication of the receiver's KYC information to the authentication server, to thereby allow the authentication server to authenticate the receiver's KYC information and to transmit the receiver's VC, corresponding to the authenticated receiver's KYC information, to the receiver's device 100b, and as a result, the receiver's device 100b may acquire the receiver's VC at a step of S205. Herein, the receiver's VC may include (i) the receiver's KYC information, (ii) an authentication server's signature value created by signing the receiver's KYC information with an authentication server's private key, and (iii) an authentication server's DID.

And, the receiver's device 100b may generate the receiver's signature value by signing the receiver's VC with the receiver's private key, and may register the receiver's signature value in the data hub 300 at a step of S206. Herein, the data hub 300 may store the receiver's signature value, as corresponding to the receiver's DID, in itself or in an external database. The receiver's signature value stored in the data hub 300 is not accessible by a third party, and data stored in the data hub 300 may be accessible by a specific user or a service provider whose access is permitted by the receiver, that is, the specific user or the service provider who has the receiver's DID or access information.

Thereafter, the receiver's device 100b may transmit the receiver's DID to the sender's device 100a at a step of S207. Herein, the receiver's device 100b may transmit a nonce signature value, which is created by signing the nonce received from the sender's device 100a with the receiver's private key, in addition to the receiver's DID, to the sender's device 100a.

And, the sender's device 100a may transmit the receiver's DID, acquired from the receiver's device 100b, to the virtual asset service providing server 200 at a step of S208. Also, the sender's device 100a may transmit the nonce signature value, acquired from the receiver's device 100b, in addition to the receiver's DID, to the virtual asset service providing server 200.

Then, the virtual asset service providing server 200 may perform or support another device to perform (i) a process of acquiring the receiver's signature value from the data hub 300 by referring to the receiver's DID, at steps of S209 and S210, where the receiver's DID is obtained from the sender's device 100a, and (ii) (ii-1) a process of acquiring the receiver's public key and the second receiver's virtual asset address from the blockchain network 500 by referring to the receiver's DID at steps of S211 and S212 where the receiver's public key and the second receiver's virtual asset address may correspond to the receiver, or (ii-2) a process of allowing the resolving server 400 to acquire the receiver's public key and the second receiver's virtual asset address from the blockchain network 500 by referring to the receiver's DID at the steps of S211 and S212. Herein, the virtual asset service providing server 200 may perform or support another device to perform a process of allowing the resolving server 400 to acquire a receiver's DID document from the blockchain network 500 by referring to the receiver's DID, and a process of acquiring the receiver's public key and the second receiver's virtual asset address from the receiver's DID document.

Thereafter, the virtual asset service providing server 200 may perform or support another device to perform a process of verifying the receiver's signature value and the first receiver's virtual asset address by using the receiver's public key and the second receiver's virtual asset address, at a step of S213.

That is, the virtual asset service providing server 200 may perform or support another device to perform (i) a process of decrypting the receiver's signature value with the receiver's public key, to thereby acquire the receiver's VC, (ii) (ii-1) a process of acquiring an authentication server's public key from the blockchain network 500 by referring to the authentication server's DID included in the receiver's VC or (ii-2) a process of allowing the resolving server 400 to acquire the authentication server's public key from the blockchain network 500 by referring to the authentication server's DID, and (iii) a process of decrypting the receiver's VC with the authentication server's public key, to thereby verify the receiver's KYC information.

Herein, the virtual asset service providing server 200 may perform or support another device to perform a process of allowing the resolving server 400 to acquire an authentication server's DID document from the blockchain network 500 by referring to the authentication server's DID, and a process of acquiring the authentication server's public key from the authentication server's DID document.

Also, the virtual asset service providing server 200 may decrypt the nonce signature value with the receiver's public key, to thereby acquire the nonce and thus verify the nonce signature value. That is, the nonce signature value may be verified by determining whether the nonce acquired from decrypting the nonce signature value is identical to the nonce transmitted to the sender's device 100a in response to the request for the registration of the receiver's KYC information.

Thereafter, if the receiver's signature value is verified and if the first receiver's virtual asset address is determined as identical to the second receiver's virtual asset address, the virtual asset service providing server 200 may perform or support another device to perform a process of registering the first receiver's virtual asset address in the whitelist at a step of S214, and a process of transmitting the virtual asset from the sender's virtual asset address to the first receiver's virtual asset address at a step of S215.

Figure 4:
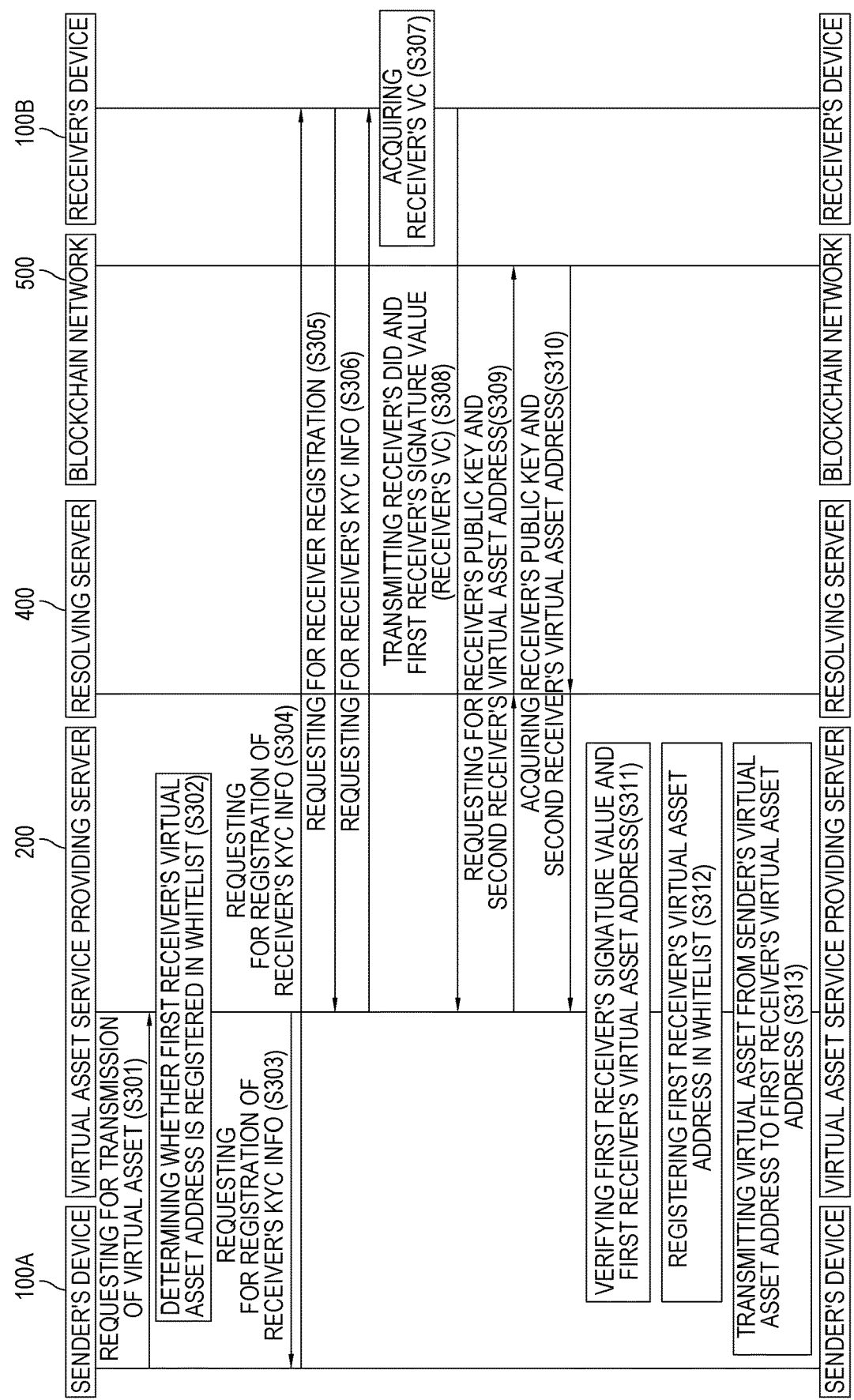
FIG. 4 is a drawing schematically illustrating a method for providing the virtual asset service based on the decentralized identifiers in accordance with still another example embodiment of the present disclosure.

Next, a method for providing the virtual asset services based on the DID in accordance with still another example embodiment of the present disclosure is described as follows by referring to FIG. 4. In the description below, the part easily deducible from the explanation of FIGS. 2 and 3 will be omitted.

The sender, who is determined as having the intention to transmit the virtual asset, may transmit the request for the transmission of the virtual asset to the virtual asset service providing server 200 by using the sender's device 100a owned by the sender, at a step of S301. Herein, the request for the transmission of the virtual asset may include the first receiver's virtual asset address corresponding to the receiver who is to receive the virtual asset.

Herein, virtual asset addresses of the users may have been registered and managed as the whitelist by the virtual asset service providing server 200 according to the authentication results of the KYC (know your customer) information corresponding to the users, and a sender's virtual asset address may already have been registered in the whitelist.

Then, the virtual asset service providing server 200 may determine whether the first receiver's virtual asset address is registered in the whitelist, where the transmission of the virtual asset to the first receiver's virtual asset address is requested, at a step of S302.

Herein, the sender's device 100*a* may transmit a sender's DID to the virtual asset service providing server 200 at a time of the request for the transmission of the virtual asset, and accordingly, the virtual asset service providing server 200 may acquire the sender's virtual asset address from the blockchain network 500 by referring to the sender's DID, and may determine whether the acquired sender's virtual asset address is registered in the whitelist, to thereby determine whether the sender is a legitimate user. As another example, the sender's device 100*a* may transmit the sender's virtual asset address to the virtual asset service providing server 200 at the time of the request for the transmission of the virtual asset, and accordingly, the virtual asset service providing server 200 may determine whether the sender's virtual asset address is registered in the whitelist, to thereby determine whether the sender is the legitimate user.

And, if the first receiver's virtual asset address is determined as registered in the whitelist, the virtual asset service providing server 200 may perform or support another device to perform a process of determining that the receiver is a legitimate user, and a process of transmitting the virtual asset, requested for the transmission, from the sender's virtual asset address to the first receiver's virtual asset address.

Meanwhile, if the first receiver's virtual asset address is determined as not registered in the whitelist, the virtual asset service providing server 200 may perform or support another device to perform a process of transmitting the request for the registration of the receiver's KYC information to the sender's device 100*a*, at a step of S303.

Then, the sender's device 100*a* may transmit the request for the registration of the receiver's KYC information to a receiver's device 100*b* owned by the receiver, at a step of S304.

And, the receiver's device 100*b* may transmit a request for receiver registration to the virtual asset service providing server 200 at a step of S305, in response to the request for the registration of the receiver's KYC information from the sender's device 100*a*.

Thereafter, the virtual asset service providing server 200 may transmit a request for the receiver's KYC information to the receiver's device 100*b* at a step of S306, in response to the request for the receiver registration, where the request for the receiver's KYC information includes a nonce.

Then, the receiver's device 100*b* may transmit the request for the authentication of the receiver's KYC information to the authentication server, to thereby allow the authentication server to authenticate the receiver's KYC information and to transmit the receiver's VC corresponding to the authenticated receiver's KYC information, and as a result, may acquire the receiver's VC at a step of S307. Herein, the receiver's VC may include (i) the receiver's KYC information, (ii) an authentication server's signature value created by signing the receiver's KYC information with an authentication server's private key, and (iii) an authentication server's DID.

And, the receiver's device 100*b* may generate a first receiver's signature value by signing the receiver's VC and the nonce with the receiver's private key, and may transmit the receiver's DID and the first receiver's signature value to the virtual asset service providing server 200 at a step of S308.

Then, the virtual asset service providing server 200 may perform or support another device to perform (i) a process of acquiring the receiver's public key and the second receiver's virtual asset address from the blockchain network 500 by referring to the receiver's DID at steps of S309 and S310, where the receiver's DID is obtained from the receiver's device 100*b*, or (ii) a process of allowing the resolving server 400 to acquire the receiver's public key and the second receiver's virtual asset address from the blockchain network 500 by referring to the receiver's DID at the steps of S309 and S310. Herein, the virtual asset service providing server 200 may perform or support another device to perform a process of allowing the resolving server 400 to acquire a receiver's DID document from the blockchain network 500 by referring to the receiver's DID, and a process of acquiring the receiver's public key and the second receiver's virtual asset address from the receiver's DID document.

Thereafter, the virtual asset service providing server 200 may perform or support another device to perform a process of verifying the first receiver's signature value and the first receiver's virtual asset address by using the receiver's public key and the second receiver's virtual asset address, at a step of S311.

That is, the virtual asset service providing server 200 may perform or support another device to perform (i) a process of decrypting the first receiver's signature value with the receiver's public key, to thereby acquire the nonce and the receiver's VC, (ii) a process of comparing (ii-1) the nonce acquired from the first receiver's signature value and (ii-2) the nonce transmitted to the receiver's device 100*b*, to thereby verify the first receiver's signature value, (iii) (iii-1) a process of acquiring the authentication server's public key from the blockchain network 500 by referring to the authentication server's DID included in the receiver's VC, or (iii-2) a process of allowing the resolving server 400 to acquire the authentication server's public key from the blockchain network 500 by referring to the authentication server's DID, and (iv) a process of decrypting the receiver's VC with the authentication server's public key, to thereby verify the receiver's KYC information.

Herein, the virtual asset service providing server 200 may perform or support another device to perform a process of allowing the resolving server 400 to acquire an authentication server's DID document from the blockchain network 500 by referring to the authentication server's DID, and a process of acquiring the authentication server's public key from the authentication server's DID document.

Thereafter, if the first receiver's signature value is verified and if the first receiver's virtual asset address is determined as identical to the second receiver's virtual asset address, the virtual asset service providing server 200 may perform or support another device to perform a process of registering the first receiver's virtual asset address in the whitelist at a step of S312, and a process of transmitting the virtual asset from the sender's virtual asset address to the first receiver's virtual asset address at a step of S313.

Figure 5:
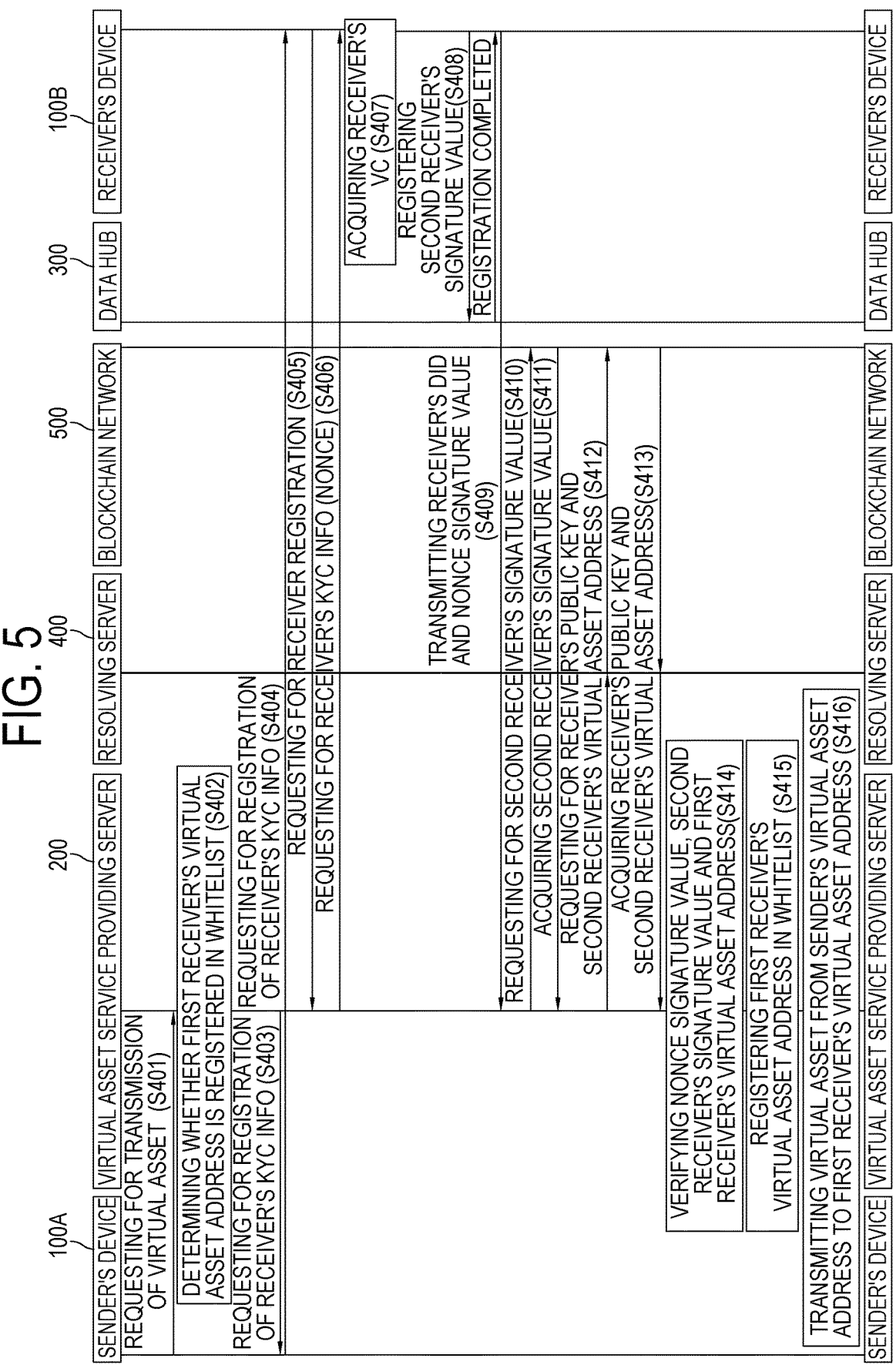
FIG. 5 is a drawing schematically illustrating a method for providing the virtual asset service based on the decentralized identifiers in accordance with still yet another example embodiment of the present disclosure.

Next, a method for providing the virtual asset services based on the DID in accordance with still yet another example embodiment of the present disclosure is described as follows by referring to FIG. 5. In the description below, the part easily deducible from the explanation of FIGS. 2 to 4 will be omitted.

The sender, who is determined as having the intention to transmit the virtual asset, may transmit the request for the transmission of the virtual asset to the virtual asset service providing server 200 by using the sender's device 100*a* owned by the sender, at a step of S401. Herein, the request for the transmission of the virtual asset may include the first receiver's virtual asset address corresponding to the receiver who is to receive the virtual asset.

Herein, virtual asset addresses of the users may have been registered and managed as the whitelist by the virtual asset service providing server 200 according to the authentication results of the KYC (know your customer) information corresponding to the users, and a sender's virtual asset address may already have been registered in the whitelist.

Then, the virtual asset service providing server 200 may determine whether the first receiver's virtual asset address is registered in the whitelist, where the transmission of the virtual asset to the first receiver's virtual asset address is requested, at a step of S402.

Herein, the sender's device 100*a* may transmit a sender's DID to the virtual asset service providing server 200 at a time of the request for the transmission of the virtual asset, and accordingly, the virtual asset service providing server 200 may acquire the sender's virtual asset address from the blockchain network 500 by referring to the sender's DID, and may determine whether the acquired sender's virtual asset address is registered in the whitelist, to thereby determine whether the sender is a legitimate user. As another example, the sender's device 100*a* may transmit the sender's virtual asset address to the virtual asset service providing server 200 at the time of the request for the transmission of the virtual asset, and accordingly, the virtual asset service providing server 200 may determine whether the sender's virtual asset address is registered in the whitelist, to thereby determine whether the sender is the legitimate user.

And, if the first receiver's virtual asset address is determined as registered in the whitelist, the virtual asset service providing server 200 may perform or support another device to perform a process of determining that the receiver is a legitimate user, and a process of transmitting the virtual asset, requested for the transmission, from the sender's virtual asset address to the first receiver's virtual asset address.

Meanwhile, if the first receiver's virtual asset address is determined as not registered in the whitelist, the virtual asset service providing server 200 may perform or support another device to perform a process of transmitting the request for the registration of the receiver's KYC information to the sender's device 100*a*, at a step of S403.

Then, the sender's device 100*a* may transmit the request for the registration of the receiver's KYC information to the receiver's device 100*b* owned by the receiver, at a step of S404.

And, the receiver's device 100*b* may transmit the request for the receiver registration to the virtual asset service providing server 200 at a step of S405, in response to the request for the registration of the receiver's KYC information from the sender's device 100*a*.

Thereafter, the virtual asset service providing server 200 may transmit the request for the receiver's KYC information to the receiver's device 100*b* at a step of S406, in response to the request for the receiver registration, where the request for the receiver's KYC information includes a nonce.

Then, the receiver's device 100*b* may transmit the request for the authentication of the receiver's KYC information to the authentication server, to thereby allow the authentication server to authenticate the receiver's KYC information and to transmit the receiver's VC, corresponding to the authenticated receiver's KYC information, to the receiver's device 100*b* and as a result, the receiver's device 100*b* may acquire the receiver's VC at a step of S407. Herein, the receiver's VC may include (i) the receiver's KYC information, (ii) an authentication server's signature value created by signing the receiver's KYC information with an authentication server's private key, and (iii) an authentication server's DID.

And, the receiver's device 100*b* may generate the second receiver's signature value by signing the receiver's VC with the receiver's private key, and may register the second receiver's signature value in the data hub 300 at a step of S408.

Thereafter, the receiver's device 100*b* may generate the nonce signature value by signing the nonce with the receiver's private key, and may transmit the receiver's DID and the nonce signature value to the virtual asset service providing server 200 at a step of S409.

Then, the virtual asset service providing server 200 may acquire the second receiver's signature value from the data hub 300 by referring to the receiver's DID at steps of S410 and S411, where the receiver's DID is obtained from the receiver's device 100*b*.

And, the virtual asset service providing server 200 may perform or support another device to perform (i) a process of acquiring the receiver's public key and the second receiver's virtual asset address from the blockchain network 500 by referring to the receiver's DID at steps of S412 and S413, where the receiver's DID is obtained from the receiver's device 100*b*, or (ii) a process of allowing the resolving server 400 to acquire the receiver's public key and the second receiver's virtual asset address from the blockchain network 500 by referring to the receiver's DID at the steps of S412 and S413. Herein, the virtual asset service providing server 200 may perform or support another device to perform a process of allowing the resolving server 400 to acquire a receiver's DID document from the blockchain network 500 by referring to the receiver's DID, and a process of acquiring the receiver's public key and the second receiver's virtual asset address from the receiver's DID document.

Thereafter, the virtual asset service providing server 200 may perform or support another device to perform a process of verifying the nonce signature value, the second receiver's signature value and the first receiver's virtual asset address by using the receiver's public key and the second receiver's virtual asset address, at a step of S414.

That is, the virtual asset service providing server 200 may decrypt the nonce signature value with the receiver's public key, to thereby acquire the nonce, and may decrypt the second receiver's signature value with the receiver's public key, to thereby acquire the receiver's VC. And, the virtual asset service providing server 200 may perform or support another device to perform (i) a process of comparing (i-1) the nonce acquired from the nonce signature value and (i-2) the nonce transmitted to the receiver's device 100*b*, to thereby verify the nonce signature value, (ii) (ii-1) a process of acquiring the authentication server's public key from the blockchain network 500 by referring to the authentication server's DID included in the receiver's VC, or (ii-2) a process of allowing the resolving server 400 to acquire the authentication server's public key from the blockchain network 500 by referring to the authentication server's DID, and (iii) a process of decrypting the receiver's VC with the authentication server's public key, to thereby verify the receiver's KYC information.

Herein, the virtual asset service providing server 200 may perform or support another device to perform a process of allowing the resolving server 400 to acquire an authentication server's DID document from the blockchain network 500 by referring to the authentication server's DID, and a process of acquiring the authentication server's public key from the authentication server's DID document.

Thereafter, if the second receiver's signature value is verified and if the first receiver's virtual asset address is determined as identical to the second receiver's virtual asset address, the virtual asset service providing server 200 may perform or support another device to perform a process of registering the first receiver's virtual asset address in the whitelist at a step of S415, and a process of transmitting the virtual asset from the sender's virtual asset address to the first receiver's virtual asset address at a step of S416.

Next, by referring to FIG. 6, processes of registering a qualified user in the method for providing the virtual asset service based on the decentralized identifiers in accordance with one example embodiment of the present disclosure are described as follows. In the description below, the part easily deducible from the explanation of FIGS. 2 to 5 will be omitted. And the exemplary processes of registering the sender as the qualified user are described.

The sender and the virtual asset service providing server 200 may have been issued their own DIDs by using the blockchain network 500. That is, the sender's device 100a and the virtual asset service providing server 200 may respectively transmit their own requests for DID generation to a DID issuing server as instructed respectively by the user and a server administrator, and accordingly, in response to the requests for the DID generation, the DID issuing server may generate the respective DIDs for the sender's device 100a and the virtual asset service providing server 200, and may register each piece of information corresponding to each of the DIDs in the distributed ledgers on the blockchain network 500. Herein, each piece of the information corresponding to each of the DIDs may include each public key, authentication information on the KYC information of the sender or the virtual asset service providing server, etc., but the scope of the present disclosure is not limited thereto, and may include various information related to the DIDs. And, each of the sender's device 100a and the virtual asset service providing server 200 may store each piece of the KYC information related to each of the DIDs. Herein, the KYC information may include personal information corresponding to the DIDs, and may be authenticated by the authentication server.

Then, the sender may transmit a request for user registration of the qualified user to the virtual asset service providing server 200 by using the sender's device 100a at a step of S501, for the transactions of the virtual assets.

And, the virtual asset service providing server 200 may transmit a request for registration of sender's KYC information to the sender's device 100a at a step of S502, in response to the request for the user registration, where the request for the user registration includes a nonce.

Then, the sender's device 100a may acquire the sender's VC from the authentication server at a step of S503, where the authentication server creates the sender's VC by authenticating the sender's KYC information. Herein, the sender's VC may include (i) the sender's KYC information, (ii) an authentication server's signature value created by signing the sender's KYC information with the authentication server's private key, and (iii) the authentication server's DID.

And, the sender's device 100a may transmit the sender's DID and the sender's signature value to the virtual asset service providing server 200 at a step of S504, where the sender's signature value is created by signing the nonce and the sender's VC with the sender's private key.

Thereafter, the virtual asset service providing server 200 may perform or support another device to perform (i) a process of acquiring the sender's public key and the sender's virtual asset address from the blockchain network 500 by referring to the sender's DID at steps of S505 and S506, where the sender's DID is obtained from the sender's device 100a, or (ii) a process of allowing the resolving server 400 to acquire the sender's public key and the sender's virtual asset address from the blockchain network 500 by referring to the sender's DID at the steps of S505 and S506.

And, the virtual asset service providing server 200 may verify the sender's signature value by using the sender's public key at a step of S507.

That is, the virtual asset service providing server 200 may perform or support another device to perform (i) a process of decrypting the sender's signature value with the sender's public key, to thereby acquire the nonce and the sender's VC, (ii) a process of comparing (ii-1) the nonce acquired from the sender's signature value and (ii-2) the nonce transmitted to the sender's device 100a, to thereby verify the sender's signature value, (iii) (iii-1) a process of acquiring the authentication server's public key from the blockchain network 500 by referring to the authentication server's DID included in the sender's VC or (iii-2) a process of allowing the resolving server 400 to acquire the authentication server's public key from the blockchain network 500 by referring to the authentication server's DID, and (iv) a process of decrypting the sender's VC with the authentication server's public key, to thereby verify the sender's KYC information.

Herein, the virtual asset service providing server 200 may perform or support another device to perform a process of allowing the resolving server 400 to acquire an authentication server's DID document from the blockchain network 500 by referring to the authentication server's DID, and a process of acquiring the authentication server's public key from the authentication server's DID document.

Thereafter, if the sender's signature value is verified, the virtual asset service providing server 200 may perform or support another device to perform a process of registering the sender's virtual asset address in the whitelist, to thereby register the sender as the qualified user, at a step of S508.

Next, by referring to FIG. 7, processes of registering the qualified user in the method for providing the virtual asset service based on the decentralized identifiers in accordance with another example embodiment of the present disclosure are described as follows. In the description below, the part easily deducible from the explanation of FIG. 6 will be omitted.

The sender may transmit the request for the user registration to the virtual asset service providing server 200 by using the sender's device 100a at a step of S601, for the transactions of the virtual assets.

And, the virtual asset service providing server 200 may transmit the request for the registration of the sender's KYC information to the sender's device 100a at a step of S602, in response to the request for the user registration, where the request for the user registration includes a nonce.

Then, the sender's device 100a may acquire the sender's VC from the authentication server at a step of S603, where the authentication server creates the sender's VC by authenticating the sender's KYC information. Herein, the sender's VC may include (i) the sender's KYC information, (ii) an authentication server's signature value created by signing the sender's KYC information with the authentication server's private key, and (iii) the authentication server's DID.

And, the sender's device 100a may generate the sender's signature value by signing the sender's VC with the sender's private key, and may register the sender's signature value in the data hub 300 at a step of S604.

Thereafter, the sender's device 100a may transmit the sender's DID and the nonce signature value to the virtual asset service providing server 200 at a step of S605, where the nonce signature value is created by signing the nonce with the sender's private key.

Then, the virtual asset service providing server 200 may perform or support another device to perform (i) a process of acquiring the sender's signature value from the data hub 300 by referring to the sender's DID at steps of S606 and S607, where the sender's DID is obtained from the sender's device 100a, and (ii) (ii-1) a process of acquiring the sender's public key and the sender's virtual asset address from the blockchain network 500 by referring to the sender's DID at steps of S608 and S609, or (ii-2) a process of allowing the resolving server 400 to acquire the sender's public key and the sender's virtual asset address from the blockchain network 500 by referring to the sender's DID at the steps of S608 and S609.

And, the virtual asset service providing server 200 may verify the nonce signature value and the sender's signature value by using the sender's public key at a step of S610.

That is, the virtual asset service providing server 200 may decrypt the nonce signature value with the sender's public key, to thereby acquire the nonce, and may compare the nonce acquired from the nonce signature value and the nonce transmitted to the sender's device 100a, to thereby verify the nonce signature value. And, the virtual asset service providing server 200 may perform or support another device to perform (i) a process of decrypting the sender's signature value with the sender's public key, to thereby acquire the sender's VC, (ii) (ii-1) a process of acquiring the authentication server's public key from the blockchain network 500 by referring to the authentication server's DID included in the sender's VC, or (ii-2) a process of allowing the resolving server 400 to acquire the authentication server's public key from the blockchain network 500 by referring to the authentication server's DID, and (iii) a process of decrypting the sender's VC with the authentication server's public key, to thereby verify the sender's KYC information.

Herein, the virtual asset service providing server 200 may perform or support another device to perform a process of allowing the resolving server 400 to acquire an authentication server's DID document from the blockchain network 500 by referring to the authentication server's DID, and a process of acquiring the authentication server's public key from the authentication server's DID document.

Thereafter, if the nonce signature value and the sender's signature value are verified, the virtual asset service providing server 200 may perform or support another device to perform a process of registering the sender's virtual asset address in the whitelist, to thereby register the sender as the qualified user, at a step of S611.

The present disclosure has an effect of preventing money laundering with the transactions of the virtual assets.

The present disclosure has another effect of easily identifying a user who is trying to launder money with the transactions of the virtual assets.

The present disclosure has still another effect of acquiring and storing information on the users performing the transactions of the virtual assets without infringing on privacy of the users.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a virtual asset service based on a DID (decentralized identifier), comprising steps of:
   (a) on condition that virtual asset addresses of users have been registered and managed as a whitelist according to authentication results of KYC (know your customer) information corresponding to the users, when a request for transmission of a virtual asset, including a first receiver's virtual asset address corresponding to a receiver who is to receive the virtual asset, is acquired from a sender's device owned by a sender who is determined as having an intention to transmit the virtual asset and has a sender's virtual asset address has already been registered in the whitelist,
   a virtual asset service providing server performing or supporting another device to perform:
      (a1) a process of determining whether the first receiver's virtual asset address is registered in the whitelist,
      (a2) in response to the first receiver's virtual asset address being determined as registered in the whitelist, a process of transmitting the virtual asset from the sender's virtual asset address to the first receiver's virtual asset address,
      (a3) in response to the first receiver's virtual asset address being determined as not registered in the whitelist, one of:

(i) a first set of processes allowing the sender's device to:
  (i-1) transmit a request for registration of receiver's KYC information to a receiver's device, to thereby allow the receiver's device to acquire a receiver's VC (verifiable credential) from an authentication server, wherein the authentication server creates the receiver's VC by authenticating the receiver's KYC information,
  (i-2) acquire a receiver's DID and a receiver's signature value from the receiver's device wherein the receiver's signature value is created by signing the receiver's VC with a receiver's private key, and
  (i-3) transmit the receiver's DID and the receiver's signature value to the virtual asset service providing server and
(ii) a second set of processes allowing the sender's device to:
  (ii-1) transmit the request for the registration of the receiver's KYC information to the receiver's device, to thereby allow the receiver's device to acquire the receiver's VC from the authentication server and thus to register the receiver's signature value in a data hub, wherein the receiver's signature value is created by signing the receiver's VC with the receiver's private key,
  (ii-2) acquire the receiver's DID from the receiver's device, and
  (ii-3) transmit the receiver's DID to the virtual asset service providing server; and
(b) the virtual asset service providing server performing or supporting another device to perform:
  (b1) one of:
    (i) a third set of processes including:
      (i-1) acquiring or allowing a resolving server to acquire a receiver's public key and a second receiver's virtual asset address from a blockchain network by referring to the receiver's DID,
        wherein the receiver's DID is obtained from the receiver's device during the first set of processes, and
        wherein the receiver's public key and the second receiver's virtual asset address correspond to the receiver, and
      (i-2) verifying the receiver's signature value and the first receiver's virtual asset address by using the receiver's public key and the second receiver's virtual asset address, and
    (ii) a fourth set of processes including:
      (ii-1) acquiring the receiver's signature value from the data hub by referring to the receiver's DID, wherein the receiver's DID is obtained from the receiver's device during the second set of processes,
      (ii-2) acquiring or allowing the resolving server to acquire the receiver's public key and the second receiver's virtual asset address from the blockchain network by referring to the receiver's DID, wherein the receiver's public key and the second receiver's virtual asset address correspond to the receiver, and
      (ii-3) verifying the receiver's signature value and the first receiver's virtual asset address by using the receiver's public key and the second receiver's virtual asset address, and
  (b2) in response to the receiver's signature value being verified and in response to the first receiver's virtual asset address being determined as identical to the second receiver's virtual asset address, a process of registering the first receiver's virtual asset address in the whitelist, and a process of transmitting the virtual asset from the sender's virtual asset address to the first receiver's virtual asset address.

2. The method of claim 1,
wherein the receiver's VC includes (i) the receiver's KYC information, (ii) an authentication server's signature value created by signing the receiver's KYC information with an authentication server's private key, and (iii) an authentication server's DID, and
wherein, at the step of (b), the virtual asset service providing server performs or supports another device to perform
  (i) a process of decrypting the receiver's signature value with the receiver's public key, to thereby acquire the receiver's VC,
  (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and
  (iii) a process of decrypting the receiver's VC with the authentication server's public key, to thereby verify the receiver's KYC information.

3. The method of claim 2, wherein the virtual asset service providing server performs or supports another device to perform a process of allowing the resolving server to acquire an authentication server's DID document from the blockchain network by referring to the authentication server's DID, and a process of acquiring the authentication server's public key from the authentication server's DID document.

4. The method of claim 1,
wherein, at the step of (a), the virtual asset service providing server performs or supports another device to perform:
  (i) a process of transmitting a nonce to the sender's device,
  (ii)
    (ii-1) during the first set of processes, a process of allowing the sender's device to transmit the nonce to the receiver's device, to thereby allow the receiver's device to add the nonce to the receiver's VC and thus to generate the receiver's signature value, a process of acquiring the receiver's DID and the receiver's signature value from the receiver's device, and a process of transmitting the receiver's DID and the receiver's signature value to the virtual asset service providing server or
    (ii-2) during the second set of processes, a process of allowing the sender's device to transmit the nonce to the receiver's device, to thereby allow the receiver's device to sign the nonce with the receiver's private key and thus to generate a nonce signature value, a process of acquiring the receiver's DID and the nonce signature value from the receiver's device, and a process of transmitting the receiver's DID and the nonce signature value to the virtual asset service providing server, and wherein, at the step of (b), the virtual asset service providing server performs or supports another device to perform:
  (i) a process of decrypting the receiver's signature value with the receiver's public key, to thereby acquire the nonce and thus verify the receiver's signature value during the third set of processes or
  (ii) a process of decrypting the nonce signature value with the receiver's public key, to thereby verify the nonce signature value during the fourth set of processes.

5. The method of claim 1, wherein, at the step of (b), the virtual asset service providing server performs or supports another device to perform a process of allowing the resolving server to acquire a receiver's DID document from the blockchain network by referring to the receiver's DID, and a process of acquiring the receiver's public key and the second receiver's virtual asset address from the receiver's DID document.

6. The method of claim 1, before the step of (a), further comprising steps of:
  (a01) in response to a request for user registration being acquired from the sender's device, the virtual asset service providing server performing or supporting another device to perform:
    (i) a process of transmitting a request for registration of sender's KYC information to the sender's device wherein the request for the registration of the sender's KYC information includes a nonce, and
    (ii)
      (ii-1) a fifth set of processes of:
        (1) allowing the sender's device to acquire a sender's VC from the authentication server, wherein the authentication server creates the sender's VC by authenticating the sender's KYC information, and
        (2) transmitting a sender's DID and a sender's signature value to the virtual asset service providing server, wherein the sender's signature value is created by signing the nonce and the sender's VC with a sender's private key or
      (ii-2) a sixth set of processes of:
        (1) allowing the sender's device to acquire the sender's VC from the authentication server, wherein the authentication server creates the sender's VC by authenticating the sender's KYC information,
        (2) registering the sender's signature value, created by signing the sender's VC with the sender's private key, in the data hub, and
        (3) transmitting the sender's DID and the nonce signature value to the virtual asset service providing server, wherein the nonce signature value is created by signing the nonce with the sender's private key; and
  (a02) the virtual asset service providing server performing or supporting another device to perform:
    (i) one of:
      (i-1) a seventh set of processes of:
        (1) acquiring a sender's public key and the sender's virtual asset address from the blockchain network by referring to the sender's DID, wherein the sender's DID is obtained from the sender's device during the fifth set of processes, and wherein the sender's public key and the sender's virtual asset address correspond to the sender, or allowing the resolving server to acquire the sender's public key and the sender's virtual asset address from the blockchain network by referring to the sender's DID, and
        (2) verifying the sender's signature value by using the sender's public key, and
      (i-2) an eighth set of processes of:
        (1) acquiring the sender's signature value from the data hub by referring to the sender's DID, wherein the sender's DID is obtained from the sender's device during the sixth set of processes,
        (2) acquiring the sender's public key and the sender's virtual asset address from the blockchain network by referring to the sender's DID, or allowing the resolving server to acquire the sender's public key and the sender's virtual asset address from the blockchain network by referring to the sender's DID, and
        (3) verifying the nonce signature value and the sender's signature value by using the sender's public key, and
    (ii) in response to the sender's signature value being verified or in response to the nonce signature value and the sender's signature value being verified, a process of registering the sender's virtual asset address in the whitelist.

7. The method of claim 6,
wherein the sender's VC includes (i) the sender's KYC information, (ii) an authentication server's signature value created by signing the sender's KYC information with an authentication server's private key, and (iii) an authentication server's DID, and
wherein, at the step of (a02), the virtual asset service providing server performs or supports another device to perform
  (i) a process of decrypting the sender's signature value with the sender's public key, to thereby acquire the sender's VC,
  (ii)
    (ii-1) a process of acquiring an authentication server's public key from the blockchain network by referring to the authentication server's DID included in the sender's VC or
    (ii-2) a process of allowing the resolving server to acquire the authentication server's public key from the blockchain network by referring to the authentication server's DID, and
  (iii) a process of decrypting the sender's VC with the authentication server's public key, to thereby verify the sender's KYC information and thus further verify the sender's signature value.

8. The method of claim 7, wherein the virtual asset service providing server performs or supports another device to perform a process of allowing the resolving server to acquire an authentication server's DID document from the blockchain network by referring to the authentication server's DID, and a process of acquiring the authentication server's public key from the authentication server's DID document.

9. A method for providing a virtual asset service based on a decentralized identifier (DID), comprising steps of:
  (a) on condition that virtual asset addresses of users have been registered and managed as a whitelist according to authentication results of KYC (know your customer) information corresponding to the users, in response to a request for transmission of a virtual asset including a first receiver's virtual asset address corresponding to a receiver who is to receive the virtual asset, is acquired from a sender's device owned by a sender who is determined as having an intention to send the virtual asset and has a sender's virtual asset address has already been registered in the whitelist, a virtual asset service providing server registers the virtual asset addresses in the whitelist and performs or supports performing or supporting another device to perform:
- (a1) a process of determining whether the first receiver's virtual asset address is registered in the whitelist,
- (a2) in response to the first receiver's virtual asset address is determined as registered in the whitelist, a process of transmitting the virtual asset from the sender's virtual asset address to the first receiver's virtual asset address, and
- (a3)
  - (i) in response to the first receiver's virtual asset address is determined as not registered in the whitelist, a process of allowing the sender's device to transmit a request for registration of receiver's KYC information to a receiver's device,
  - (ii) in response to a request for receiver registration is acquired from the receiver's device in response to the request for the registration of the receiver's KYC information, a process of transmitting a request for the receiver's KYC information to the receiver's device, wherein the request for the receiver's KYC information includes a nonce, and
  - (iii) one of:
    - (iii-1) a ninth set of processes of allowing the receiver's device to:
      - (1) acquire a receiver's VC (verifiable credential) from an authentication server, wherein the authentication server creates the receiver's VC by authenticating the receiver's KYC information, and
      - (2) transmit a receiver's DID and a first receiver's signature value to the virtual asset service providing server, wherein the first receiver's signature value is created by signing the receiver's VC and the nonce with a receiver's private key, and
    - (iii-2) a tenth set of processes of allowing the receiver's device to:
      - (1) acquire the receiver's VC from the authentication server, wherein the authentication server creates the receiver's VC by authenticating the receiver's KYC information,
      - (2) register a second receiver's signature value, created by signing the receiver's VC with the receiver's private key, in a data hub, and
      - (3) transmit the receiver's DID and a nonce signature value to the virtual asset service providing server, wherein the nonce signature value is created by signing the nonce with the receiver's private key; and
- (b) the virtual asset service providing server performing or supporting another device to perform:
  - (b1) one of:
    - (i) an eleventh set of processes of
      - (i-1) acquiring or allowing a resolving server to acquire a receiver's public key and a second receiver's virtual asset address from a blockchain network by referring to the receiver's DID, wherein the receiver's DID is obtained from the receiver's device during the ninth set of processes and wherein the receiver's public key and the second receiver's virtual asset address correspond to the receiver, and
      - (i-2) verifying the first receiver's signature value and the first receiver's virtual asset address by using the receiver's public key and the second receiver's virtual asset address, and
    - (ii) a twelfth set of processes of:
      - (ii-1) acquiring the second receiver's signature value from the data hub by referring to the receiver's DID, wherein the receiver's DID is obtained from the receiver's device during the tenth set of processes,
      - (ii-2) acquiring or allowing the resolving server to acquire the receiver's public key and the second receiver's virtual asset address from the blockchain network by referring to the receiver's DID, and
      - (ii-3) verifying the nonce signature value, the receiver's signature value and the first receiver's virtual asset address by using the receiver's public key and the second receiver's virtual asset address, and
  - (b2)
    - (1) in response to the first receiver's signature value being verified and in response to the first receiver's virtual asset address being determined as identical to the second receiver's virtual asset address, or
    - (2) in response to the nonce signature value and the second receiver's signature value being verified and in response to the first receiver's virtual asset address being determined as identical to the second receiver's virtual asset address, a process of registering the first receiver's virtual asset address in the whitelist, and a process of transmitting the virtual asset from the sender's virtual asset address to the first receiver's virtual asset address.

10. The method of claim 9,
wherein the receiver's VC includes (i) the receiver's KYC information, (ii) an authentication server's signature value created by signing the receiver's KYC information with an authentication server's private key, and (iii) an authentication server's DID, and wherein, at the step of (b), the virtual asset service providing server performs or supports another device to perform
- (i) a process of decrypting the first receiver's signature value or the second receiver's signature value with the receiver's public key, to thereby acquire the receiver's VC,
- (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and
- (iii) a process of decrypting the receiver's VC with the authentication server's public key, to thereby verify the receiver's KYC information.

11. A virtual asset service providing server that registers virtual asset addresses of users in a whitelist and provides a virtual asset service based on a DID (decentralized identifier), comprising:
  at least one memory that stores instructions; and
  at least one processor configured to execute the instructions to perform or support another device to perform:
    (I) on condition that the virtual asset addresses of users have been registered and managed as the whitelist according to authentication results of KYC (know your customer) information corresponding to the users, in response to a request for transmission of a virtual asset, including a first receiver's virtual asset address corresponding to a receiver who is to receive the virtual asset, being acquired from a sender's device owned by a sender who is determined as having an intention to transmit the virtual asset, and has a sender's virtual asset address has already been registered in the whitelist,
      (I-1) a process of determining whether the first receiver's virtual asset address is registered in the whitelist,
      (I-2) in response to the first receiver's virtual asset address being determined as registered in the whitelist, a process of transmitting the virtual asset from the sender's virtual asset address to the first receiver's virtual asset address,
      (I-3) in response to the first receiver's virtual asset address being determined as not registered in the whitelist, one of:
        (i) first set of processes of allowing the sender's device to:
          (i-1) transmit a request for registration of receiver's KYC information to a receiver's device, to thereby allow the receiver's device to acquire a receiver's VC (verifiable credential) from an authentication server, wherein the authentication server creates the receiver's VC by authenticating the receiver's KYC information,
          (i-2) acquire a receiver's DID and a receiver's signature value from the receiver's device wherein the receiver's signature value is created by signing the receiver's VC with a receiver's private key, and
          (i-3) transmit the receiver's DID and the receiver's signature value to the virtual asset service providing server and
        (ii) second set of processes of allowing the sender's device to:
          (ii-1) transmit the request for the registration of the receiver's KYC information to the receiver's device, to thereby allow the receiver's device to acquire the receiver's VC from the authentication server and thus to register the receiver's signature value in a data hub, wherein the receiver's signature value is created by signing the receiver's VC with the receiver's private key,
          (ii-2) acquire the receiver's DID from the receiver's device, and
          (ii-3) transmit the receiver's DID to the virtual asset service providing server, and
    (II) (II-1) one of
      (i) a third set of processes including:
        (i-1) acquiring or allowing a resolving server to acquire a receiver's public key and a second receiver's virtual asset address from a blockchain network by referring to the receiver's DID, wherein the receiver's DID is obtained from the receiver's device during the first set of processes and wherein the receiver's public key and the second receiver's virtual asset address correspond to the receiver, and
        (i-2) verifying the receiver's signature value and the first receiver's virtual asset address by using the receiver's public key and the second receiver's virtual asset address, and
      (ii) a fourth set of processes including:
        (ii-1) acquiring or allowing the resolving server to acquire the receiver's signature value from the data hub by referring to the receiver's DID, wherein the receiver's DID is obtained from the receiver's device during the second set of processes,
        (ii-2) acquiring the receiver's public key and the second receiver's virtual asset address from the blockchain network by referring to the receiver's DID, wherein the receiver's public key and the second receiver's virtual asset address correspond to the receiver, and
        (ii-3) verifying the receiver's signature value and the first receiver's virtual asset address by using the receiver's public key and the second receiver's virtual asset address, and
      (II-2) in response to the receiver's signature value being verified and in response to the first receiver's virtual asset address being determined as identical to the second receiver's virtual asset address, a process of registering the first receiver's virtual asset address in the whitelist, and a process of transmitting the virtual asset from the sender's virtual asset address to the first receiver's virtual asset address.

12. The virtual asset service providing server of claim 11, wherein the receiver's VC includes (i) the receiver's KYC information, (ii) an authentication server's signature value created by signing the receiver's KYC information with an authentication server's private key, and (iii) an authentication server's DID, and
  wherein, at the process of (II), the processor performs or supports another device to perform
    (i) a process of decrypting the receiver's signature value with the receiver's public key, to thereby acquire the receiver's VC,
    (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and
    (iii) a process of decrypting the receiver's VC with the authentication server's public key, to thereby verify the receiver's KYC information.

13. The virtual asset service providing server of claim 12, wherein the processor performs or supports another device to perform a process of allowing the resolving server to acquire an authentication server's DID document from the blockchain network by referring to the authentication server's DID, and a process of acquiring the authentication server's public key from the authentication server's DID document.

14. The virtual asset service providing server of claim 11, wherein, at the process of (I), the processor performs or supports another device to perform
(i) a process of transmitting a nonce to the sender's device,
(ii)
(ii-1) during the first set of processes, a process of allowing the sender's device to transmit the nonce to the receiver's device, to thereby allow the receiver's device to add the nonce to the receiver's VC and thus to generate the receiver's signature value, a process of acquiring the receiver's DID and the receiver's signature value from the receiver's device, and a process of transmitting the receiver's DID and the receiver's signature value to the virtual asset service providing server or
(ii-2) during the second set of processes, a process of allowing the sender's device to transmit the nonce to the receiver's device, to thereby allow the receiver's device to sign the nonce with the receiver's private key and thus to generate a nonce signature value, a process of acquiring the receiver's DID and the nonce signature value from the receiver's device, and a process of transmitting the receiver's DID and the nonce signature value to the virtual asset service providing server, and wherein, at the process of (II), the processor performs or supports another device to perform
(i) a process of decrypting the receiver's signature value with the receiver's public key, to thereby acquire the nonce and thus verify the receiver's signature value during the third set of processes or
(ii) a process of decrypting the nonce signature value with the receiver's public key, to thereby verify the nonce signature value during the fourth set of processes.

15. The virtual asset service providing server of claim 11, wherein, at the process of (II), the processor performs or supports another device to perform a process of allowing the resolving server to acquire a receiver's DID document from the blockchain network by referring to the receiver's DID, and a process of acquiring the receiver's public key and the second receiver's virtual asset address from the receiver's DID document.

16. The virtual asset service providing server of claim 11, wherein, before the process of (I), the processor further performs or supports another device to perform:
(I01) in response to a request for user registration being acquired from the sender's device,
(i) a process of transmitting a request for registration of sender's KYC information to the sender's device wherein the request for the registration of the sender's KYC information includes a nonce, and
(ii)
(ii-1) a fifth set of processes of:
(1) allowing the sender's device to acquire a sender's VC from the authentication server, wherein the authentication server creates the sender's VC by authenticating the sender's KYC information, and
(2) transmitting a sender's DID and a sender's signature value to the virtual asset service providing server, wherein the sender's signature value is created by signing the nonce and the sender's VC with a sender's private key or
(ii-2) a sixth set of processes of
(1) allowing the sender's device to acquire the sender's VC from the authentication server, wherein the authentication server creates the sender's VC by authenticating the sender's KYC information,
(2) registering the sender's signature value, created by signing the sender's VC with the sender's private key, in the data hub, and
(3) transmitting the sender's DID and the nonce signature value to the virtual asset service providing server, wherein the nonce signature value is created by signing the nonce with the sender's private key; and
(I02)
(i) one of (i-1) a seventh set of processes of
(1) acquiring a sender's public key and the sender's virtual asset address from the blockchain network by referring to the sender's DID, wherein the sender's DID is obtained from the sender's device during the fifth set of processes and wherein the sender's public key and the sender's virtual asset address correspond to the sender, or allowing the resolving server to acquire the sender's public key and the sender's virtual asset address from the blockchain network by referring to the sender's DID, and
(2) verifying the sender's signature value by using the sender's public key, and
(i-2) an eighth set of processes of:
(1) acquiring the sender's signature value from the data hub by referring to the sender's DID, wherein the sender's DID is obtained from the sender's device during the sixth set of processes,
(2) acquiring the sender's public key and the sender's virtual asset address from the blockchain network by referring to the sender's DID, or allowing the resolving server to acquire the sender's public key and the sender's virtual asset address from the blockchain network by referring to the sender's DID, and
(3) verifying the nonce signature value and the sender's signature value by using the sender's public key, and
(ii) in response to the sender's signature value being verified or in response to the nonce signature value and the sender's signature value being verified, a process of registering the sender's virtual asset address in the whitelist.

17. The virtual asset service providing server of claim 16, wherein the sender's VC includes (i) the sender's KYC information, (ii) an authentication server's signature value created by signing the sender's KYC information with an authentication server's private key, and (iii) an authentication server's DID, and
wherein, at the process of (I02), the processor performs or supports another device to perform
(i) a process of decrypting the sender's signature value with the sender's public key, to thereby acquire the sender's VC,
(ii) (ii-1) a process of acquiring an authentication server's public key from the blockchain network by referring to the authentication server's DID included in the sender's VC or (ii-2) a process of allowing the resolving server to acquire the authentication server's public key from the blockchain network by referring to the authentication server's DID, and
(iii) a process of decrypting the sender's VC with the authentication server's public key, to thereby verify the sender's KYC information and thus further verify the sender's signature value.

18. The virtual asset service providing server of claim 17, wherein the processor performs or supports another device to perform a process of allowing the resolving server to acquire an authentication server's DID document from the blockchain network by referring to the authentication server's DID, and a process of acquiring the authentication server's public key from the authentication server's DID document.

19. A virtual asset service providing server that registers virtual asset addresses of users in a whitelist and provides a virtual asset service based on a decentralized identifier (DID), comprising:
  at least one memory that stores instructions; and
  at least one processor configured to execute the instructions to perform or support another device to perform:
    (I) on condition that the virtual asset addresses of users have been registered and managed as the whitelist according to authentication results of KYC (know your customer) information corresponding to the users, in response to a request for transmission of a virtual asset, including a first receiver's virtual asset address corresponding to a receiver who is to receive the virtual asset, being acquired from a sender's device owned by a sender who is determined as having an intention to send the virtual asset and has a sender's virtual asset address has already been registered in the whitelist,
      (I-1) a process of determining whether the first receiver's virtual asset address is registered in the whitelist,
      (I-2) in response to the first receiver's virtual asset address being determined as registered in the whitelist, a process of transmitting the virtual asset from the sender's virtual asset address to the first receiver's virtual asset address, and
      (I-3)
        (i) in response to the first receiver's virtual asset address being determined as not registered in the whitelist, a process of allowing the sender's device to transmit a request for registration of receiver's KYC information to a receiver's device,
        (ii) in response to a request for receiver registration being acquired from the receiver's device in response to the request for the registration of the receiver's KYC information, a process of transmitting a request for the receiver's KYC information to the receiver's device, wherein the request for the receiver's KYC information includes a nonce, and
        (iii) one of
          (iii-1) a ninth set of processes of allowing the receiver's device to
            (1) acquire a receiver's VC (verifiable credential) from an authentication server, wherein the authentication server creates the receiver's VC by authenticating the receiver's KYC information, and
            (2) transmit a receiver's DID and a first receiver's signature value to the virtual asset service providing server, wherein the first receiver's signature value is created by signing the receiver's VC and the nonce with a receiver's private key, and
          (iii-2) a tenth set of processes of allowing the receiver's device to
            (1) acquire the receiver's VC from the authentication server, wherein the authentication server creates the receiver's VC by authenticating the receiver's KYC information,
            (2) register a second receiver's signature value, created by signing the receiver's VC with the receiver's private key, in a data hub, and
            (3) transmit the receiver's DID and a nonce signature value to the virtual asset service providing server, wherein the nonce signature value is created by signing the nonce with the receiver's private key and
    (II)
      (II-1) one of
        (i) an eleventh set of processes of:
          (i-1) acquiring or allowing a resolving server to acquire a receiver's public key and a second receiver's virtual asset address from a blockchain network by referring to the receiver's DID, wherein the receiver's DID is obtained from the receiver's device during the ninth set of processes and wherein the receiver's public key and the second receiver's virtual asset address correspond to the receiver, and
          (i-2) verifying the first receiver's signature value and the first receiver's virtual asset address by using the receiver's public key and the second receiver's virtual asset address, and
        (ii) a twelfth set of processes of:
          (ii-1) acquiring or allowing the resolving server to acquire the second receiver's signature value from the data hub by referring to the receiver's DID, wherein the receiver's DID is obtained from the receiver's device during the tenth set of processes,
          (ii-2) acquiring the receiver's public key and the second receiver's virtual asset address from the blockchain network by referring to the receiver's DID, and
          (ii-3) verifying the nonce signature value, the receiver's signature value and the first receiver's virtual asset address by using the receiver's public key and the second receiver's virtual asset address, and
      (II-2)
        (1) in response to the first receiver's signature value being verified and in response to the first receiver's virtual asset address being determined as identical to the second receiver's virtual asset address or
        (2) in response to the nonce signature value and the second receiver's signature value being verified and in response to the first receiver's virtual asset address being determined as identical to the second receiver's virtual asset address, a process of registering the first receiver's virtual asset address in the whitelist, and a process of transmitting the virtual asset from the sender's virtual asset address to the first receiver's virtual asset address.

20. The virtual asset service providing server of claim 19, wherein the receiver's VC includes (i) the receiver's KYC information, (ii) an authentication server's signature value created by signing the receiver's KYC information with an authentication server's private key, and (iii) an authentication server's DID, and wherein, at the process of (II), the processor performs or supports another device to perform
- (i) a process of decrypting the first receiver's signature value or the second receiver's signature value with the receiver's public key, to thereby acquire the receiver's VC,
- (ii) (ii-1) a process of acquiring an authentication server's public key from the blockchain network by referring to the authentication server's DID included in the receiver's VC or (ii-2) a process of allowing the resolving server to acquire the authentication server's public key from the blockchain network by referring to the authentication server's DID, and
- (iii) a process of decrypting the receiver's VC with the authentication server's public key, to thereby verify the receiver's KYC information.

* * * * *